United States Patent [19]
Hennessey et al.

[11] Patent Number: 5,515,453
[45] Date of Patent: May 7, 1996

[54] APPARATUS AND METHOD FOR IMAGE PROCESSING IN SYMBOLIC SPACE

[75] Inventors: A. Kathleen Hennessey; YouLing Lin, both of Lubbock, Tex.; Kwang-Soo Hahn, Seoul, Rep. of Korea

[73] Assignees: Beacon System, Inc.; Texas Tech University, both of Lubbock, Tex.

[21] Appl. No.: 186,750

[22] Filed: Jan. 21, 1994

[51] Int. Cl.$^6$ .................................................. G06K 9/00
[52] U.S. Cl. .......................... 382/141; 382/254; 382/209; 382/217; 395/150
[58] Field of Search ............................ 382/8, 9, 30, 41, 382/16, 35, 54, 22, 56, 25, 26, 28, 33, 141, 173, 254, 209; 395/155, 150, 127; 364/413.06, 443, 449

[56] References Cited

U.S. PATENT DOCUMENTS

| | | | |
|---|---|---|---|
| 4,958,939 | 9/1990 | Samad | 382/35 |
| 4,967,376 | 10/1990 | Katsura | 364/521 |
| 5,097,329 | 3/1992 | Hasegawa et al. | 382/8 |
| 5,128,776 | 7/1992 | Scorse et al. | 382/9 |
| 5,293,433 | 3/1994 | Bernsen et al. | 382/54 |
| 5,297,243 | 3/1994 | Shiotani et al. | 382/33 |
| 5,317,647 | 3/1994 | Pagallo | 382/30 |

OTHER PUBLICATIONS

Kwang–Soo Hahn, "Investigation of a Fuzzy Grammar for Automated Visual Inspection"–Dissertation in Interdisciplinary Engineering–Texas Tech Univ., Aug. 1989.

YouLing Lin, "Techniques for Syntactic Analysis of Images with Application for automatic Visual Inspection"–Dissertation in Business Adm.,–Texas Tech Univ., Dec., 1990.

*Primary Examiner*—Jose L. Couso
*Assistant Examiner*—Anh Hong Do
*Attorney, Agent, or Firm*—Robert L. Troike; Leo N. Heiting; Richard L. Donaldson

[57] ABSTRACT

A method and apparatus (62) for processing images in symbolic space are disclosed. The method may include the steps of capturing a visual image (40), converting the visual image to a digital image (42), decomposing the digital image into image primitives (44), and processing the image primitives in symbolic space (46). The processing of the image primitives may include grouping the image primitives to form higher level image primitives, isolating portions of an image, filtering noise, identifying portions of an image, or adding to a knowledge base. The system or apparatus (62) for processing an image in symbolic space may include a camera (64), a video-to-digital converter (66), and a computer (68) with appropriate memory and software; the processing may include grouping the image primitives to form higher level image primitives, isolating portions of an image, filtering noise, identifying portions of an image, or adding to a knowledge base.

15 Claims, 13 Drawing Sheets

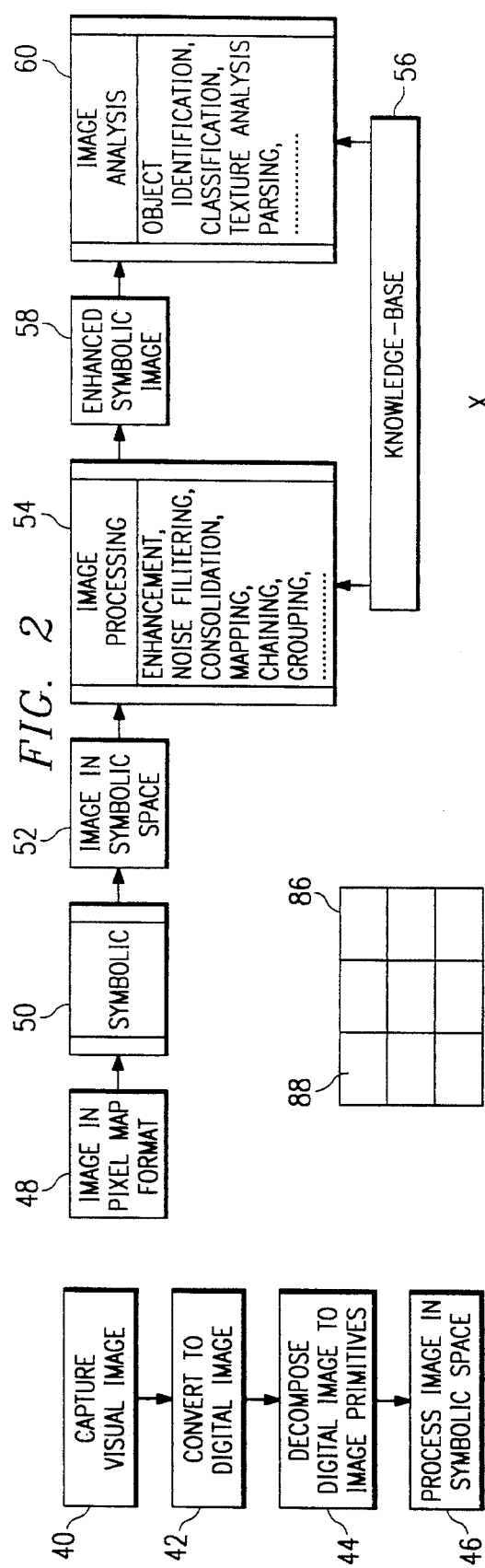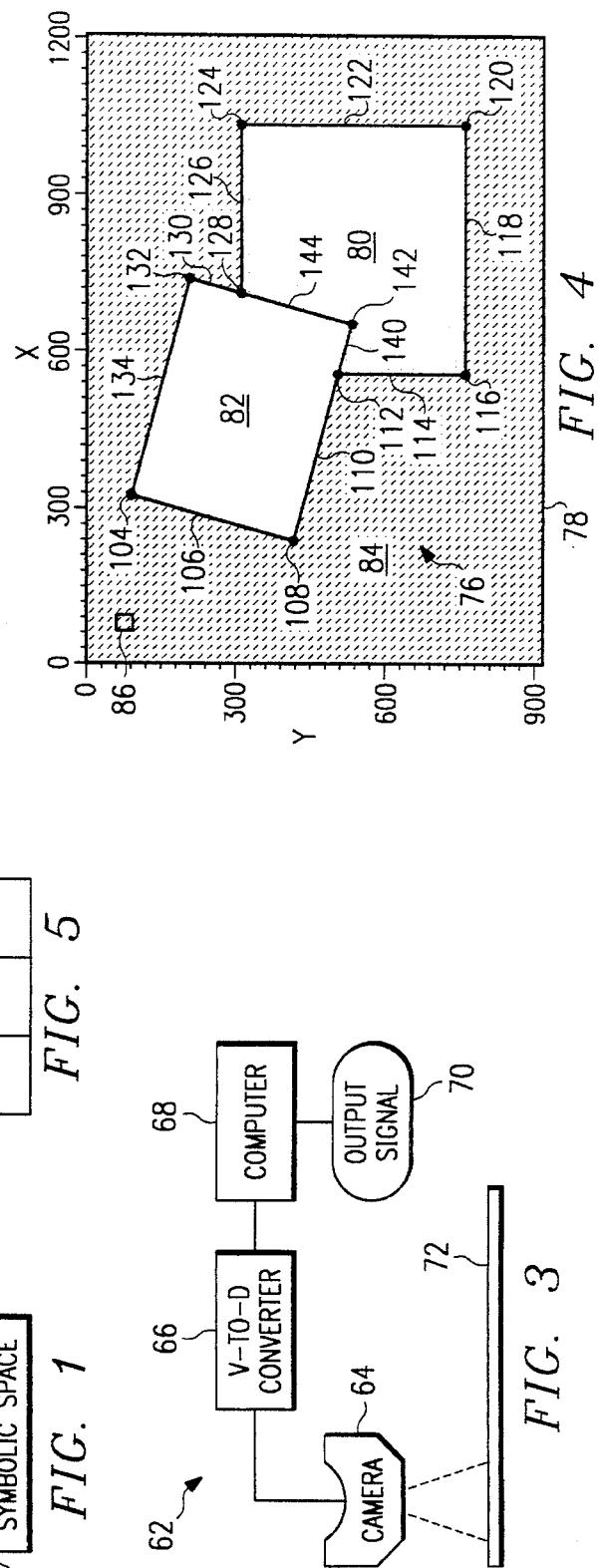

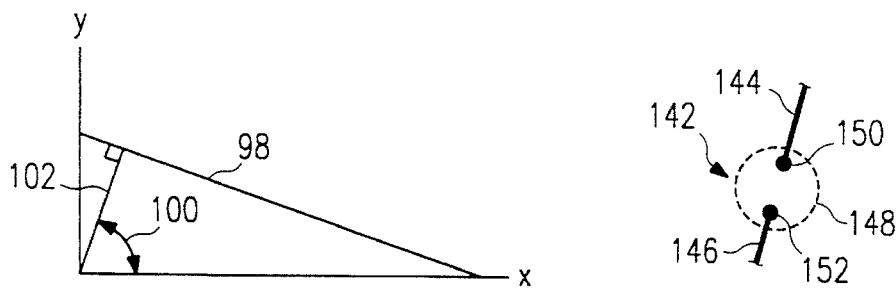
FIG. 6
FIG. 9
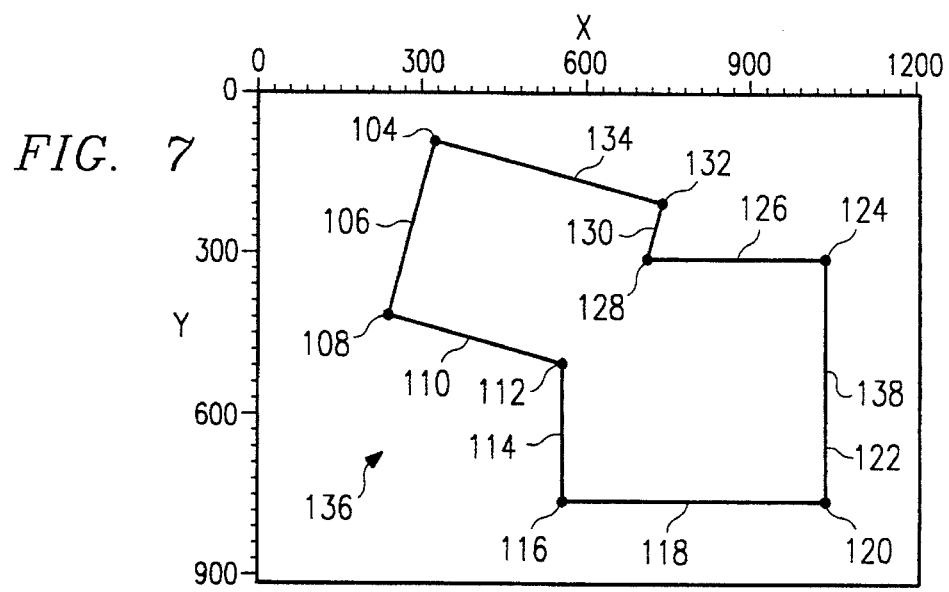
FIG. 7
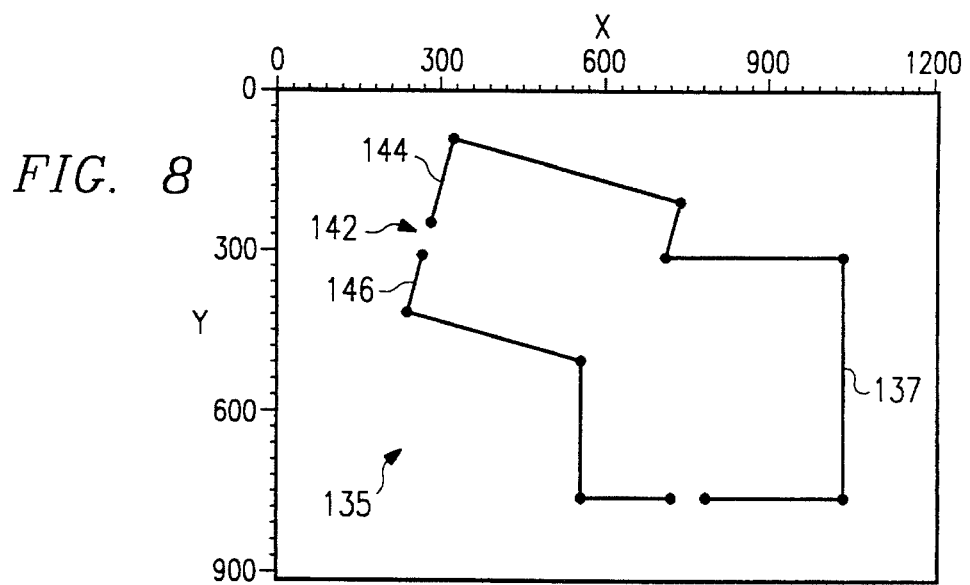
FIG. 8

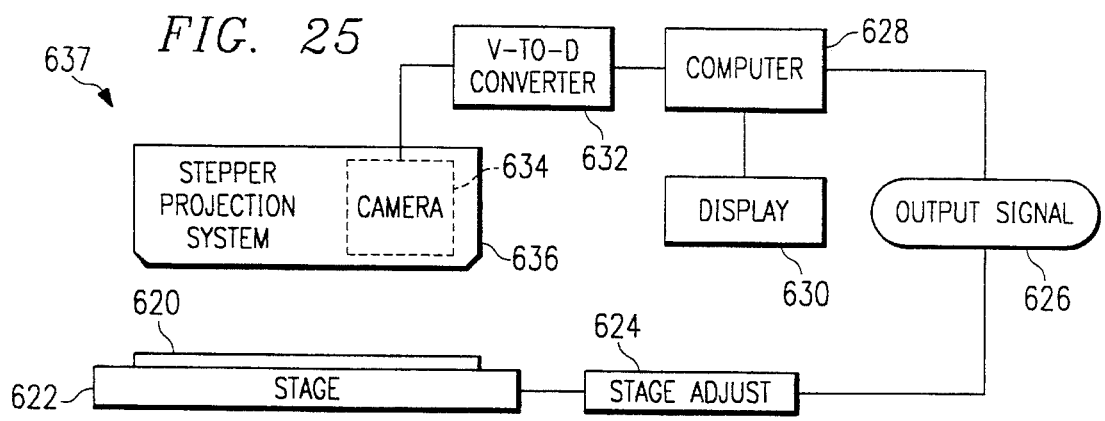
FIG. 25
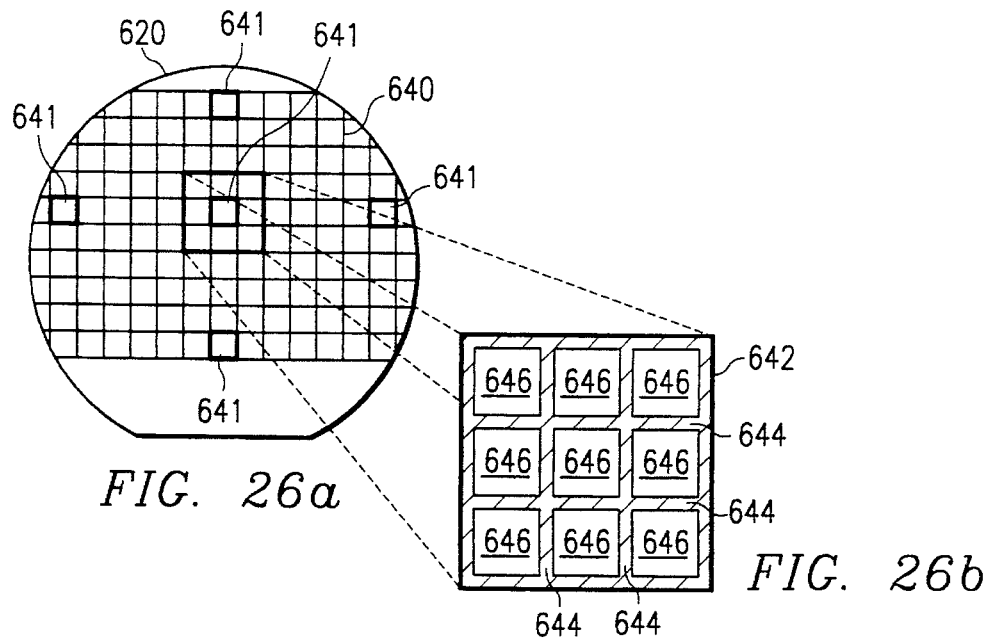
FIG. 26a
FIG. 26b
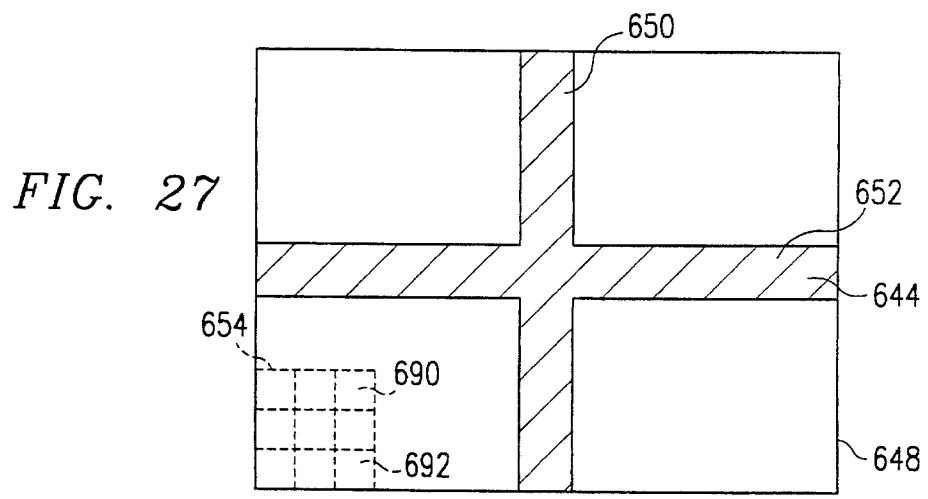
FIG. 27

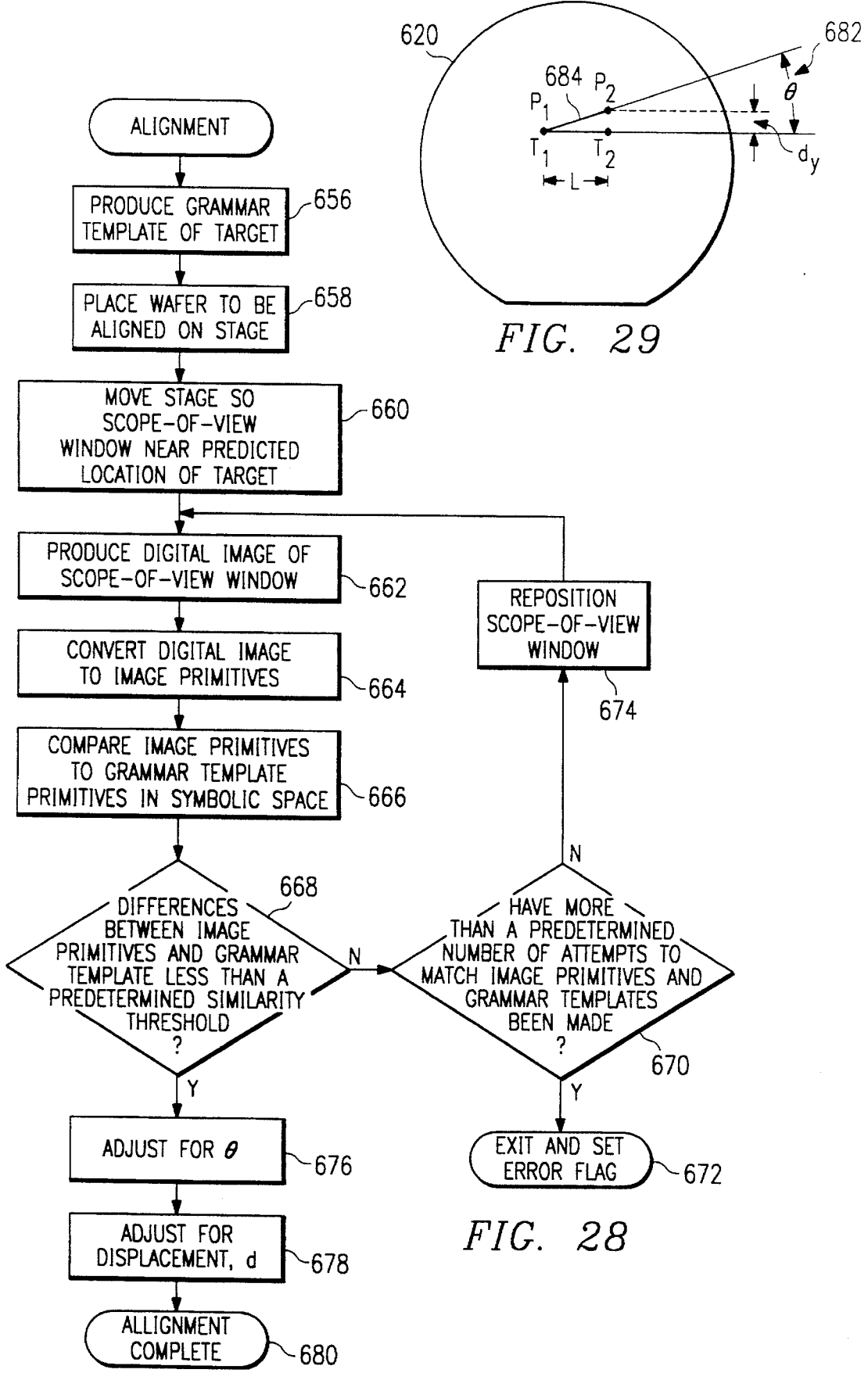

APPARATUS AND METHOD FOR IMAGE PROCESSING IN SYMBOLIC SPACE

RELATED APPLICATIONS

This application is related to the following patent applications, incorporated herein by reference:

U.S. patent application Ser. No. 08/186,691 filed Jan. 21, 1994, entitled *Apparatus and Method for Aligning and Measuring Misregistration;* and U.S. patent application Ser. No. 08/185,610 filed Jan. 21, 1994, entitled *System and Method for Recognizing Visual Indicia.*

TECHNICAL FIELD OF THE INVENTION

This invention relates to image processing, and more particularly, relates to an apparatus and method for image processing in symbolic space.

BACKGROUND OF THE INVENTION

In a number of technical fields, for example in the manufacture of integrated circuits, it is desirable to represent a visual image in a digital format with a pixel-by-pixel representation of the image (pixel map) and to process the digital image to perform various tasks. The digital image may be used to locate items within the image or to otherwise process, store or transmit the image.

The conventional techniques and apparatuses for performing these tasks may have had shortcomings such as requiring large periods of time to process the images or requiring expansive memory allocations in the computers performing the image processing. Additionally, prior art techniques may have had considerable difficulties identifying images on cluttered or noisy backgrounds. Furthermore, attempts to process the image on a basis other than pixel-by-pixel have typically been limited to simple figures on non-noisy backgrounds.

SUMMARY OF THE INVENTION

The present invention provides an apparatus and method for image processing in symbolic space that reduces or eliminates shortcomings that may have been associated with conventional apparatuses and methods for processing images. According to an aspect of the present invention, a method is provided that includes capturing a visual image in a scope-of-view window, converting the visual image to a digital image, and decomposing the digital image into image primitives to allow processing of the image and symbolic space. According to another aspect of the present invention, an apparatus is provided including a camera and video-to-digital converter for capturing a visual image as a digital image, and a computer with appropriate software and memory to allow the digital image to be decomposed into image primitives and thereafter process the image in symbolic space.

According to another aspect of the present invention, a method for capturing a visual image as a digital image and processing the digital image in symbolic space to form higher level image primitives is provided. According to another aspect of the present invention, an apparatus is provided with a camera and video-to-digital converter for capturing a digital image, and a computer with appropriate software and memory to allow processing of the digital image in symbolic space to form higher level image primitives.

According to another aspect of the present invention, a method is provided for capturing a digital image and processing the image in symbolic space to isolate segments of the image. According to another aspect of the present invention, an apparatus is provided with a camera and video-to-digital converter for capturing a digital image and a computer with appropriate memory and software for processing the digital image in symbolic space to isolate segments of the image.

According to another aspect of the present invention, a method is provided for capturing a digital image and processing the image in symbolic space to filter noise from the image in symbolic space. According to another aspect of the present invention, an apparatus is provided including a camera and video-to-digital converter for capturing a digital image and a computer with appropriate memory and software for processing the digital image in symbolic space to filter noise from the image.

According to another aspect of the present invention, a method is provided for capturing a digital image, decomposing the image into image primitives, creating a knowledge base with grammar primitives, comparing the image primitives of the digitized image to the grammar primitives to find the best match and to thereby identify all or a portion of the image. According to another aspect of the present invention, an apparatus is provided that includes a camera and video- to-digital converter for capturing a digital image, and a computer with appropriate memory and software to decompose the image into image primitives, to create a knowledge base with grammar primitives, to compare the image primitives and grammar primitives to find the best match, and to identify therefrom a portion or all of the captured image.

A technical advantage of the present invention may be that it allows image processing on a computer with smaller memory requirements or processor capabilities for a given time period compared to other techniques. Another technical advantage of the present invention may be that for a given memory allocation, the invention may allow faster image processing. Another technical advantage of the present invention may be that it allows processing of an image in symbolic space which allows mathematical techniques to be utilized. Yet another technical advantage of the present invention may be that it allows for an image processor that can learn on the job.

BRIEF DESCRIPTION OF THE DRAWINGS

For a more complete understanding of the present invention, and the advantages thereof, reference is now made to the following description taken in conjunction with the accompanying drawings, in which:

FIG. 1 is a block diagram showing steps that may be used in carrying out an aspect of the present invention;

FIG. 2 is a block diagram showing the relationship of several aspects of the present invention;

FIG. 3 is a schematic representation of an apparatus for processing images in symbolic space according to one aspect of the present invention;

FIG. 4 is a simplified image that may be decomposed into image primitives according to an aspect of the present invention;

FIG. 5 is an schematic representation of a decomposition window according to an aspect of the present invention;

FIG. 6 is a schematic representation of a line, which may be represented by image primitives according to one aspect of the present invention;

FIG. 7 is a schematic representation of the outer border of the image of FIG. 4;

FIG. 8 is a simplified image having broken line segments that may be decomposed into image primitives according to an aspect of the present invention;

FIG. 9 is a schematic representation of two adjacent line segments from FIG. 8;

FIG. 25 is a schematic representation of another embodiment of aspects of the present invention for aligning wafers containing patterns;

FIG. 26a is a schematic plan view of a wafer;

FIG. 26b is an exploded section of FIG. 26a showing scribe intersections;

FIG. 27 is a schematic plan view of one particular scribe intersection on the wafer of FIG. 26a;

FIG. 28 is a block diagram showing the steps of one method of accomplishing one aspect of the present invention;

FIG. 29 is a schematic plan view of a wafer showing a skew of θ;

DETAILED DESCRIPTION OF THE INVENTION

Figure 10:
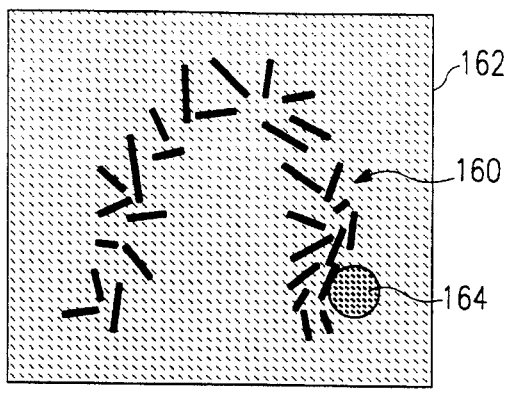
FIG. 10 is a schematic representation of line segments being grouped to form higher level image primitives according to one aspect of the present invention.

The preferred embodiments of the present invention and its advantages are best understood by referring to FIGS. 1–36 of the drawings, like numerals being used for like and corresponding parts of the various drawings.

IMAGE DECOMPOSITION AND SYMBOLIC SPACE PROCESSING

An aspect of the present invention provides a method and apparatus for image processing that includes capturing a digital image, but instead of processing the image as a pixel map, the image is converted to symbols and operations and processing occur on the symbols that represent the image (primitives in vector or symbolic space). Image primitives are discrete bits of information that represent an image or attributes of an image. Image primitives may allow an image to be represented with a minimal amount of information. For a simple example, a circle might be represented by two primitives: one locating the center of the circle and the other giving the radius. Primitives may include such information a the texture, gradient and length of a line segment, start point, end point, curvature for a curvilinear segment, or other attributes. Primitives may be used to represent images such as aerial photographs, semiconductor wafers, or any image in digital format.

Symbolic primitives, which may be in a homogenous vector format, represent the image in vector or symbolic space. Subsequent image processing and analysis such as image enhancement, noise filtering, and pattern recognition may be performed on the image in symbolic space, which may be faster than a pixel-by-pixel processing approach. Processing in symbolic space enables one to process images with mathematical techniques. This approach may be conducive to knowledge-based architecture that interacts with human experts to acquire knowledge, i.e., develop a knowledge base. The knowledge base may be derived from means of inference, information entered by experts, or extracted from existing or newly created files and experience, or through direct entry such as entering computer aided design files.

Referring to FIG. 1, four basic steps that may be involved with image processing in symbolic space according to an aspect of the present invention are shown. First, a visual image is captured (block 40) and is converted to a digital image (block 42); the capturing and converting of the visual image to a digital image may be simultaneously accomplished. The digital image is then converted to image primitives (block 44), and then the image primitives may be processed in symbolic space (block 46) as desired.

Referring to FIG. 2, aspects of the image processing apparatus and method are shown interrelated. Blocks 48 through 52 represent the capturing of the visual image and decomposing it to image primitives or symbols to allow for image processing in symbolic space. Block 54 shows a number of processing steps that may be accomplished on the image in symbolic space, and as shown by block 56, the processing in block 54 may utilize information from a knowledge base as will be described further below. After image processing in block 54, which enhances the image in some respect as noted at block 58, the image may be further analyzed at block 60, and again, the further image analysis at block 60 may involve knowledge base 56.

Referring to FIG. 3, there is shown a schematic representation of an apparatus or system 62 for image processing in symbolic space according to an aspect of the present invention. System 62 may include a camera 64 with a coupled video-to-digital converter 66 for capturing a visual image, which is represented by reference numeral 72 and shown as a two dimensional object (it is to be understood that camera 64 may readily be used to capture three dimensional images), and converting the image to a digital image. Alternatively, camera 64 may capture the image directly in digital format. Video-to-digital converter 66 delivers the digital representation of the image in a pixel-by-pixel format to computer 68. Computer 68 may include a processor and memory as necessary to store the pixel-by-pixel information from V-to-D converter 66 and software as necessary to decompose and process the information as described below. Computer 68 may have an output signal 70 that may be fed to other devices or shown on a video interface for both. Computer 68 may be used to decompose the digital image to symbols or image primitives and to perform the image processing in symbolic space, e.g., (blocks 44 and 46 of FIG. 1). In one embodiment of the present invention, computer 68 may be a PC with a 486 processor and eight megabytes of RAM memory.

Once a pixel map of the visual image is developed, the image must be decomposed to primitives; that is, converted into discrete bits of information that numerically represent the figure in a manner greatly reduced from the pixel-by-pixel format. At one level, the decomposition aspect of the present invention involves consideration of the various line and arc segments that form an image, and storing information such as the start point (SP), end point (EP), texture to the left of the segment (LT), texture to the right of the segment, direction (RT), curvature (if any), and the length between the points for each linear or curvilinear segment. To be useful in many industrial applications, the image decomposition should be able to occur on a noisy or cluttered background.

Referring now to FIG. 4, a simplified image 76 is shown. The apparatus and methods of the present invention may handle much more complex images on noisy and cluttered backgrounds, but the simplified figure of FIG. 4 is presented to discuss one approach to decomposing an image according to an aspect of the present invention. FIG. 4 shows an image 76 shown in scope-of-view window 78. Scope-of-view window 78 may be, for example, the scope of an image caught by camera 64 of FIG. 3. In the example of FIG. 4, image 76 is formed by a first polygon 80 and a second polygon 82 on a background 84. The texture of the two polygons 80 and 82 in the background 84 are distinct and for the simplified example are uniform.

The texture of image 76 and background 84 may be represented numerically in different formats; one method of representing the background is to use a gray scale (e.g., a 0-to-255 gray scale). For the example of FIG. 4, let the gray scale of background 84 be 192, the gray scale of first polygon 80 be 57, and the gray scale of second polygon 82 be 20. Scope-of-view window 78 is shown in FIG. 4 as a 1200×900 pixel window. To locate and to decompose image 76, a decomposition or kernel window 86 is passed through scope-of-view window 78 as will be described below, beginning at the upper lefthand corner, which for the example is the point (0,0).

In order to describe how the image 76 of FIG. 4 may be decomposed into symbols or image primitives, the equations that may be used to represent line segments or curvilinear segments are developed. The decomposition does not have to be exact because of the image processing techniques that may be utilized do not require an exact decomposition.

If S represents a procedure for decomposing an image, which will be explained in more detail below, and Y represents the image, then there exists a set of primitive vectors P, such that P=S(Y), where wherein $p_i$ is a primitive vector. The primitive vector $p_i$ may be defined as follows:

$$p_i[POS, TEX, STAT, RELA, GEO] \quad (2)$$

where
POS=location information: start point (SP) and endpoint (EP).
TEX=texture information: left texture (LT) and right texture (RT).
STAT=statistical information: shape standard deviation (SS) and color standard deviation (SC).
RELA=relational information: label (LB) left region (LR) and right region (RR).
GEO=geometric information: type (TP) direction (D) and length (L).

There may also exist an inverse transform to S, such that $Y=S^{-1}(P)$, i.e., the original image can be substantially recovered from its symbolic primitives P. The −1 means that the transformation back to the original image is not exact. The technique for recovering the image may allow the present invention to compress images for transmission.

To decompose an image according to an aspect of the present invention, a decomposition box or window, e.g., decomposition window 86 of FIGS. 4 and 5, may be passed in a search pattern until locating a portion of an image (e.g., a line or curvilinear segment), and then window 86 may track or trace the image to develop information. The decomposition window 86 is caused to trace a portion of the border of the image.

The trace performed by the decomposition window may be defined as:

$$T=(z_1, z_2, \ldots, a_n) \quad (3)$$

and, if $$z_i=[x_i, y_i] \quad (4)$$

of the image, then the image is formed by:

$$Z_i = \max_{x,y \in S} |G*I(x,y)| \quad (5)$$

where I(x,y) is the image, G is the gradient operator, and * is the convolution operator. S is the set of pixels for the search direction.

A statistical technique may be used to compute the texture value, t(x,y). For example, if we let $t_o$ be the desired texture, then the maximum weighted trace is now:

$$Z_i = \max_{x,y \in S} (W_1|G*I(x,y)| - W_2|t(x,y) - t_0|) \quad (6)$$

The direction of the trace can be an important aspect in deriving the equations used in an aspect of the present invention. In this regard, we define the magnitude of the gradient at x,y as follows:

$$G_m(x,y) = |G*I(x,y)| \quad (7)$$

and, let the direction of gradient at x,y be noted as follows:

$$G_d(x,y) = \angle(G*I(x,y)) \quad (8)$$

The combination of these equations allows a final maximum weighted trace formula to be derived:

$$z_i = \max_{x,y \in S} (W_1 G_m(x,y) - W_2|G_d(x,y) - G_0|_{(mod 2\pi)} - W_3|t(x,y) - t_0|) \quad (9)$$

In using this equation, equation (9) the scope-of-view window is scanned or searched until a trigger-threshold is reached. Then, the trace of the boundary by the maximum weighted trace equation, equation (9), is used. When $t(x,y)$ is greater than the trace threshold or if the segment is closed, the primitives are then defined as described below; otherwise, the previous pixel is masked (i.e., the fact that the pixel has been considered or evaluated is noted by the processor that is performing the decomposition, and the decomposition process continues). This technique allows for edges of one pixel in width to be obtained, and the trace equation (9) takes the best point on that portion of the boundary, and thereby provides an adaptive threshold that actually adjusts the threshold according to local statistics.

Once the trace, T, is formed for a segment, the next step is to obtain symbolic or image primitives from it. As an initial approach to converting the trace to image primitives, the image may be analyzed in terms of line segments and arcs, and an optimization technique may be used for this step. One example of this process is described below.

Given a trace, T, and the definition of a primitive, p, an estimator $\hat{T}$ may be found that belongs to p, and best represents T. The estimator $\hat{T}$, is said to be a symbolized primitive of the image if it represents the trace T and belongs to p. One measure of performance of the estimator $\hat{T}$ is the average squared error or mean squared error:

$$m.s.e. = E(T - \hat{T}) \quad (10)$$

where:

$T = \{z_1, z_2, \ldots, z_n\}$ and $\hat{T} = \{\hat{z}_1, \hat{z}_2, \ldots, \hat{z}_n\}$.

The definitions that may be used for line and arc primitives of an image are now described as is the technique for finding the estimator $\hat{T}$ that minimizes the mean squared error (m.s.e.):

$$m.s.e. = \min_{\hat{T} \in P} \Sigma (z_i - \hat{z}_i)^2. \quad (11)$$

which, for a given set of data, finds the best symbol to represent the relevant feature of the original image.

Referring now to FIG. 6, primitives for line segments are considered. Because a two-dimensional representation of a line by the familiar equation $y = ax + b$ may cause numerical problems when the slope is close to infinity, it may be desirable to represent the line in another manner. Therefore, in deriving the equations used with this aspect of the invention, the line primitive p may be defined as follows:

$$P: r = x_i \cos\beta + y_i \sin\beta \quad (12)$$

where r is the perpendicular distance from the origin to the line or an extension thereof, and $\beta$ is the angle the normal line makes with the abscissa. For line 98 of FIG. 6, $\beta$ is referenced by character 100 and the normal line to the abscissa by character 102. For this equation, all $\hat{T}$ will satisfy equation (12), but trace $T = \{z_1, z_2, \ldots, z_n\}$ will not.

The estimator $\hat{T}$ is now found that belongs to the line primitive family of the equation (12) and best represents T for the pixels of a sample segment. If we begin with the equations:

$$S_x^2 = \frac{1}{n-1} \sum_{i=1}^{n} (x_i - \bar{x})^2 \quad (13)$$

$$S_y^2 = \frac{1}{n-1} \sum_{i=1}^{n} (y_i - \bar{y})^2 \quad (14)$$

$$S_{xy} = \frac{1}{n-1} \sum_{i=1}^{n} (x_i - \bar{x})(y_i - \bar{y}), \quad (15)$$

then the two parameters in line primitive definition (12) are given by:

$$\beta = \text{arctan}\left(\frac{(S_y^2 - S_x^2) + \sqrt{(S_y^2 - S_x^2)^2 + 4S_{xy}^2}}{2S_{xy}}\right) \quad (16)$$

and $$r = \bar{x}\cos\beta + \bar{y}\sin\beta. \quad (17)$$

This previous relationship is made clear by considering trace $T = \{z_1, z_2, \ldots, z_n, z_i\}$ and $Z_i = [x_i, y_i]$ to be observations from the random vector $Z = [X, Y]'$. The result comes directly from the first principal component minimizing the sum of squared distances between the observations $z_i$ and the line decided by $L_i = e_{11}X + e_{12}Y$ represented in the rectangle coordinate system. Here $e_{11}, e_{12}]$ is the eigenvector of the covariance matrix of the random vector Z, associated with the larger eigenvalue $\lambda_1$.

The larger eigenvalue associated with the covariance matrix $$\begin{bmatrix} S_x^2 & S_{xy} \\ S_{xy} & S_y^2 \end{bmatrix} \quad (18)$$

is $$\lambda_i = \frac{(S_x^2 + S_y^2) + \sqrt{(S_y^2 - S_x^2)^2 + 4S_{xy}^2}}{2}, \text{ and} \quad (19)$$

$$[e_{11}, e_{12}] = \left[1, \frac{\lambda - S_x^2}{S_{xy}}\right]. \quad (20)$$

Therefore, we arrive at:

$$\tan\beta = \frac{e_{12}}{e_{11}} = \frac{(S_y^2 - S_x^2) + \sqrt{(S_y^2 - S_x^2)^2 + 4S_{xy}^2}}{2S_{xy}} \quad (21)$$

and

-continued $$r = \bar{x}\cos\beta + \bar{y}\sin\beta. \tag{22}$$

The error function, E, to be minimized in the mean squared error expression is:

$$E = \sum_{i=1}^{n} \{r - (x_i\cos\beta + y_i\sin\beta)\}^2. \tag{23}$$

For a sample $z_1, z_2, \ldots, z_n$ and $z_i=[x_i, y_i]$, we are to find the minimum of E. The parameter of $\beta$ also can be given by:

$$\beta = \frac{1}{2} \arctan\left(\frac{2S_{xy}}{S_x^2 - S_y^2}\right). \tag{24}$$

This may be seen by taking the partial derivative of E with respect to r and $\beta$:

$$\frac{\partial E}{\partial r} = 2 \sum_{i=1}^{n} \{r - (x_i\cos\beta + y_i\sin\beta)\} \tag{25}$$

and $$\frac{\partial E}{\partial \beta} = 2 \sum_{i=1}^{n} \{r - (x_i\cos\beta + y_i\sin\beta)\}(-x_i\sin\beta + y_i\cos\beta). \tag{26}$$

If we set these equations equal to zero and substituting for r, the equation becomes:

$$\sum_{i=1}^{n} [(\bar{x}\cos\beta + \bar{y}\sin\beta) - (x_i\cos\beta + y_i\sin\beta)](x_i\sin\beta - y_i\cos\beta) = 0 \tag{27}$$

or $$(\cos^2\beta - \sin^2\beta)\left(\sum_{i=1}^{n} x_i y_i - n\bar{x}\bar{y}\right) + \cos\beta\sin\beta\left(\left(\sum_{i=1}^{n} y_i^2 - n\bar{y}^2\right) - \sum_{i=1}^{n} x_i^2 - n\bar{x}^2\right) = 0 \tag{28}$$

Since $\cos^2\beta - \sin^2\beta = \cos2\beta$ and $\sin\beta\cos\beta = \frac{1}{2}\sin2\beta$, this expression becomes:

$$\cos2\beta(n-1)s_{xy} + \frac{1}{2}\sin2\beta((n-1)s_y^2 - (n-1)s_x^2) = 0 \tag{29}$$

where $s_x^2$ is the sample variance of the x's, $s_y^2$ is the sample variance of the y's, and $s_{xy}$ is the sample covariance between x and y. This can be written as:

$$\tan2\beta = \frac{2s_{xy}}{s_x^2 - s_y^2} \tag{30}$$

or $$\beta = \frac{1}{2} \arctan[2s_{xy}/(s_x^2 - s_y^2)]. \tag{31}$$

The procedure is to calculate $\beta$ from the above formula and then substitute this value into the formula for r:

$$r = \bar{x}\cos\beta + \bar{y}\sin\beta \tag{32}$$

giving a corresponding value for r, so that the equation of the line segment is determined. Thus, it can be seen that equations (16) and (24) are identical.

Showing equations (16) and (24) to be identical may be accomplished as follows. Using equation (16) to represent the tan2$\beta$, the resulting equation is represented as follows:

$$\tan2\beta = \frac{2\tan\beta}{1 - \tan^2\beta}, \tag{33}$$

which in turn, with appropriate substitutions, may be written as:

$$\tan2\beta = \tag{34}$$

$$\frac{\frac{(S_y^2 - S_x^2) + \sqrt{(s_y^2 - S_x^2)^2 + 4S_{xy}^2}}{S_{xy}}}{1 - \frac{(S_y^2 - S_x^2)^2 + (S_y^2 - S_x^2)\sqrt{(S_y^2 - S_x^2)^2 + 4S_{xy}^2} + 2S_{xy}^2}{2S_{xy}^2}}$$

This form of the expression reduces to:

$$\tan2\beta = \frac{2S_{xy}}{S_x^2 - S_y^2}, \tag{35}$$

which is the same as equation (24).

The above referenced equations describe how a primitive line is converted from a two-dimensional image to its symbolic format or primitives. The attributes of the primitives representing the line may be used to determine whether the resultant line is a good fit. For example, sample variance and maximum deviation may be used to measure how well the line is represented.

The sample variance may be given by:

$$S^2 = \frac{\sum_{i=1}^{n}(r - (x_i\cos\beta + y_i\sin\beta))^2}{n-2}, \tag{36}$$

which may be represented as:

$$S^2 = \frac{n-1}{n-2}(S_x^2\cos^2\beta + 2S_{xy}\sin\beta\cos\beta + s_y^2\sin^2\beta). \tag{37}$$

This variance, or its square root, standard deviation, is a measure of the scatter of the points around the line. The maximum deviation, MD, is given by:

$$MD = \max_{1 \leq i \leq n} |r - (x_i\cos\beta + y_i\sin\beta)|. \tag{38}$$

In the context of inspecting semiconductor wafers and integrated circuits for defects, the maximum deviation is one measure of the error caused by a defect. The deviation may be used to assist in filtering or removing noise in symbolic space as described below.

Having shown the equations that may be used to develop primitives for line segments, arc or curvilinear segments of an image are now considered. The arc primitives may be represented as follows for each point $(x_i, y_i)$ or the segment:

$$x_i = \phi_m(i) \tag{39}$$

and $$y_i = \psi_m(i) \tag{40}$$

where $\phi_m$ and $\psi_m$ are functions composed of orthogonal polynomials of degree n, such that:

$$\phi_m(i) = \sum_{j=0}^{m} C_j P_{jn}(i). \tag{41}$$

Only $x = \phi_m(i)$ will be discussed here, since the same results apply to $y = \psi_m(i)$. The parametric form of equation (39) rather than the explicit form $y = y(x)$ may be used to represent an arc in order to reduce computation time.

The coefficients $C_j (j=0, 1, \ldots, m)$ are defined as follows:

$$C_j = \frac{\sum_{i=0}^{n} P_{jn}(i)x_i}{\sum_{i=0}^{n} P_{jn}^2(i)} . \quad (42)$$

The objective is to minimize the squared errors:

$$Min = \sum_{i=0}^{n} [\phi_m(i) - x_i]^2; \quad (43)$$

that is, to find $C_0, C_1, \ldots, C_m$ that minimizes:

$$\phi(C_0, C_1, \ldots, C_m) = \sum_{i=0}^{n} \left[ \sum_{j=0}^{m} C_j P - jn(i) - x_i \right]^2 . \quad (44)$$

Taking the partial derivatives of { with respect to the parameters yields:

$$\frac{\partial \phi}{\partial C_k} = 2 \sum_{i=0}^{n} \left[ \sum_{j=0}^{m} C_j P_{jn}(i) - x_i \right] P_{kn}(i), (k = 0, 1, \ldots m). \quad (45)$$

By setting these derivatives to zero and letting:

$$a_{jk} = \sum_{i=0}^{n} P_{jn}(i) P_{kn}(i) \quad (46)$$

$$a_k = \sum_{i=0}^{n} P_{kn}(i) x_i,$$

then equation (45) can be written as:

$$\sum_{j=0}^{m} a_{jk} C_j = a_k. \quad (47)$$

Since $p_{jn}(i)$ are orthogonal polynomials, it follows that:

$$a_{jk} = \begin{cases} 0, j \neq k \\ 1, j = k. \end{cases} \quad (48)$$

Thus $C_j$ may be obtained simply as follows:

$$C_j = a_j/a_{jj}, j=0, 1, \ldots, m \quad (49)$$

and $p_{jn}(i)$ may have the form $$P_{jn}(i) = \sum_{k=0}^{j} (-1)^k \binom{j}{k} \binom{j+k}{k} \frac{i^{(k)}}{n^{(k)}} \quad (50)$$

where $$i^{(k)} = \frac{i!}{(i-k)!} \quad (51)$$

and $$\binom{j}{k} = \frac{j!}{k!(j-k)!} . \quad (52)$$

The equations derived above allow each segment, linear or curvilinear, to be represented by image primitives, but there must be a system for determining what segments or portions are to be decomposed at a given instance. Several techniques may be used to define segments within the image for decomposition. For example, a gradient change may be the signal of the start of a new line or arc segment. For example, if we let $T^g = \{g_i, \ldots, g_n\}$ be the gradients of the trace $T=\{z_1, \ldots, z_n\}$, so that a difference may be defined as $dg_i = (_{i+1} - g_{i-1}) \pmod{2\pi}$, then, for example, an appropriate segment may be considered as follows:

Line start: $dg_g=0$

ARC start: $dg_1 > \pi/6$ or $\int dg_g > \pi$

LINE/ARC end: the start of the next LINE/ARC.

A regression method may be used that is based on the error of the regression for a segment. In a regression method as applied in this aspect of the present invention, certain points $z_1, z_2, \ldots, z_i$, and the previously described mathematical definitions of the line and arc segments may be used to perform a regression to fit the points. Thus, the start and stop for the segments would be defined as follows:

LINE/ARC: the previous LINE/ARC segment end.

LINE/ARC end: the point at which the minimum error of the regression is greater or equal to the predetermined tolerance $\epsilon$.

A simplified example of the decomposition of an image according to an aspect of the present invention is now described. Referring again to FIG. 4, decomposition window 86 is passed beginning from the upper lefthand corner (0,0) in the +X direction, i.e., to the right. The decomposition window 86 may consist of sections 88 (FIG. 5) that are used to compare pixels within different sections of deposition window 86 to determine the gradient for window 86. Decomposition window 86 may have a default search pattern that begins at the origin (0,0) in the upper lefthand corner, and traces in a search pattern in the positive X-direction until reaching the right edge of the scope-of-view window 78, at which time it returns to the left edge of scope-of-view window 78 (i.e., x=0), and increments in the Y-direction by the width of the decomposition window 86. This search pattern is continued until a portion of an image is detected by decomposition window 86 by locating a gradient greater than background 84 by a specified threshold amount. The decomposition window 86 then traces the image as will be described below, and then returns to where the trace began for that particular image segment and continues the search pattern until another segment is found. The segments that have already been decomposed are masked, i.e., the processor will not trace that aspect of the image when it encounters it later in the search pattern. This process continues until the entire window is searched or until enough information is gained for a particular process.

Upon reaching corner 104 of polygon 82 of image 76, decomposition window 86 senses the gradient of line 106 and begins tracing in the direction of segment 106, and each pixel considered along line segment 106 is processed according to the previously developed equations, while searching for a change in gradient which may signal a new line segment or the end of the line segment. Upon reaching corner 108, calculations for decomposition window 86 indicate or sense a change in the gradient that is greater than a predetermined gradient threshold, and therefore, line 106 is considered a single segment for decomposition purposes. For the simplified example, the primitives of the start point, end point, left texture and right texture are developed. The standard deviation and curvature are also calculated in most embodiments of this aspect of the invention.

For the segment of line 106, the start point is approximately (330, 90) and the end point is approximately (240, 390). Moving from the start point to the end point, the texture is recorded on each side of the segment of line 106. To the left (for the frame of reference of corner 104 facing corner 108) of line 106, the gray scale value 20 is recorded and a gray scale* value of 192 is recorded for the right value. Having completed the first segment, the decomposition window 86 continues along the outer trace along line 110, i.e., moves in the direction consistent with the changing gradient. The path of decomposition window 86 is in the direction consistent with the changing gradient, and if two gradients are received in window 86, the decomposition window 86 may proceed with a programmed bias to one direction or the other, e.g., seek to make lefthand traces. Additionally, in tracing the border, if window 86 reaches a dead end of a segment, after decomposing that segment, it will attempt to retrace its steps to where it lasts sensed other gradients within window 86 (i.e., where it had to decide which way to go), and will proceed down the other gradient. If at any time it is unable to complete a trace of the border of a complete image to return to where it started, it will do as much as possible and then return to where it began the segment and continue with the search pattern.

Continuing with the example of FIG. 4, upon reaching corner 112, decomposition window 86 will sense a change in gradient signaling the end of the segment of line 110. The start and stop and left and right texture information for line 110 is recorded. Decomposition window 86 senses two gradients at corner 112: The gradient of line segment 114 and the gradient of line segment 140; however, for this example, a preprogrammed bias seeking the outer most gradient has been utilized. Continuing to trace the outer border, the window 86 then proceeds along line 114 to corner 116, where a change in gradient is again sensed that signals the end of a segment. The start, stop and texture information is then recorded for line 114. The same process continues for lines 118, 122, 126, 130 and 134 with the respective corners 120, 124, 128 and 132. The trace thus makes a closed pattern ending at corner 104 as shown in FIG. 7. The following chart is thus produced for the outer trace of image 76.

TABLE I

| Line Segment | Start Point | End Point | Left Texture | Right Texture |
| --- | --- | --- | --- | --- |
| 106 | (330, 90) | (240, 390) | 20 | 192 |
| 110 | (240, 390) | (550, 490) | 20 | 192 |
| 114 | (550, 490) | (550, 730) | 57 | 192 |
| 118 | (550, 730) | (1040, 730) | 57 | 192 |
| 122 | (1040, 730) | (1040, 330) | 57 | 192 |
| 126 | (1040, 330) | (710, 330) | 57 | 192 |
| 130 | (710, 330) | (740, 190) | 20 | 192 |
| 134 | (740, 190) | (330, 90) | 20 | 192 |

The above chart symbolically represents the outline of the image 76 as shown by reference numeral 136 in FIG. 7. The information on the left and right texture is determined by part of the decomposition window 86 that is to either side of the gradient being followed or traced. After having decomposed the line segments in Table I, the system 62 masks or otherwise instructs, computer 68 disregards the location of the line segments already decomposed, and the search for additional segments continues where the previous trace began. Thus, having started the trace of the border 138 (FIG. 7) at point 104 (FIG. 4), the decomposition window 86 returns to point 104 and continues the search pattern moving to the right. Because of masking, the next point that decomposition window 86 will pick up to trace is point 112 (just to one side of it) where line segment 140 begins. The trace will continue to corner 142 then along line segment 144 and finally terminating at point 128 again because of masking. The additional line segments produce the following information:

TABLE II

| Line Segment | Start Point | End Point | Left Texture | Right Texture |
| --- | --- | --- | --- | --- |
| 140 | (550, 490) | (670, 520) | 20 | 57 |
| 144 | (670, 520) | (710, 330) | 20 | 57 |

For the simplified image 76 of FIG. 4, the trace will again continue after masking the new line segments 140 and 144, but for the image 76, there will be no additional entries, i.e., the end of search patter is reached (for some embodiments the search may terminate once an adequate amount of information is obtained that may be less than the entire window 78). Thus, the final decomposed image may be represented by the following table of image primitives:

TABLE III

| Line Segment | Start Point | End Point | Left Texture | Right Texture |
| --- | --- | --- | --- | --- |
| 106 | (330, 90) | (240, 390) | 20 | 192 |
| 110 | (240, 390) | (550, 490) | 20 | 192 |
| 114 | (550, 490) | (550, 730) | 20 | 192 |
| 118 | (550, 730) | (1040, 730) | 57 | 192 |
| 122 | (1040, 730) | (1040, 330) | 57 | 192 |
| 126 | (1040, 330) | (710, 330) | 57 | 192 |
| 130 | (710, 330) | (740, 190) | 20 | 192 |
| 134 | (740, 190) | (330, 90) | 20 | 192 |
| 140 | (550, 490) | (670, 520) | 20 | 57 |
| 144 | (670, 520) | (710, 330) | 20 | 57 |

Having decomposed image 76 to image primitive, the processing of the primitives or symbols in symbolic space may begin. Note that Table III represents image 76 with a small fraction of the information required for a pixel map of the same image.

In decomposing an image, such as image 76 of FIG. 4, the ability to trace a particular aspect of an image may be impaired by discontinuities in the various line segments. Certain discontinuities may be addressed, however, during the decomposition process. For example, consider FIG. 8, which shows discontinuities developed in a trace of the border 137 of image 135. The discontinuities may be caused by any of a number of things such as noise. During the decomposition process, consideration may be given to whether an additional gradient is sensed within a predetermined distance of the end point of the previous line segment. For example, considering FIGS. 8 and 9, for the discontinuity 142 between line segments 144 and 146, if the end point 150 of line 144 is within predetermined distance, which is represented figuratively by the diameter of circle 148, of start point 152 of line segment 146, and if the texture to the left and right of line segments 144 and 146 are fairly consistent, i.e., within a predetermined threshold, the discontinuity will be removed by generating a line segment to connect them. Thus, the discontinuous trace of the border 137 shown in FIG. 8 could be represented similar to border 138 of image 136 shown in FIG. 7.

The analysis or processing of the image in symbolic space may include any of a number of desirable operations such as enhancing the image by inference, enhancing the image by making symbolic primitive perfects, filtering noise at the symbolic level, or locating or identifying objects within the image based on a knowledge-base. Before processing an image, it may be desirable to have a knowledge-base available containing information on objects to be located or analyzed within an image.

One aspect of image processing according to the present invention includes grouping image primitives in a manner that allows isolation of a particular image. For example, referring again to image 76 of FIG. 4, and the image primitives of Table III, which symbolically represents image 76, it may be desirable to isolate polygon 82 from other aspects of image 76. To group the particular image, the left and right textures for the various segments may be compared. The segments containing the same or approximately the same left and right textures, Group I, are then considered. If an end point for a particular segment in Group I of segments, which have approximately the same textures, approximately coincides with a start point of another segment belonging to Group I, then the two segments are linked as being part of the same aspect of image 76. For example, considering line segment 106, which has a left texture of 20 and a right texture of 192, and an end point 108, this segment 106 is linked with segment 110 because they share the same left and right texture, and the end point of segment 106, point 108, coincides with the starting point, point 108 of line segment 110. Thus, in the first pass through Table III in this manner, the following line segments would be linked: line segment 106, line segment 110, line segment 130, and line segment 134. The image thus far linked does not make a closed pattern. Therefore, the analysis continues attempting to group a closed image. The next step may be to consider line segments having a left or right texture that approximately match the interior texture of the segments grouped thus far, e.g., having a gray scale of 20 for this example, for its left or right texture of the segment. Thus, the segments to be considered are line segments 140 and 144 because their left texture is 20. The process then considers whether any of the segments in this second group, Group II, has a starting point or end point that approximately coincides with the starting point or ending point of a line segment that has already been grouped. In the example, because line segment 140 of this second group has starting point 112 which approximately coincides with ending point 112 of line segment 110, line segment 140 is added to the grouped image. In a similar fashion, because segments 144 and 128 approximately share point 128, segment 144 is likewise grouped. Thus, first polygon 82 is grouped or isolated from image 76. In a similar fashion, or by other images such as polygon 80 may be grouped.

Image process in symbolic space according to an aspect of the present invention may allow for the filtering of noise. Although in the example of decomposing image 76 of FIG. 4 above, the standard deviation for the line segments were not described. That information may be produced by the equations previously discussed. As each pixel of information is considered by decomposition window 86 during the decomposition process, running calculations are maintained to allow the standard deviation to be calculated for each segment, along with the approximation of the curvature, if any, such as by a n-degree polynomial or B-spline. The deviation may be used to filter noise from the image in symbolic space. For example, when a line segment is shown to be short compared to other line segments of the image, and to have a high standard deviation, it may be considered noise and deleted from the image primitives. In this manner, noise in the image may be removed by processing in symbolic space.

While the example given for FIG. 4 did not involve curvilinear segments, the approach is substantially the same for images with curvilinear segments. For a curvilinear segment, the start point and end point are provided along with an approximation of the curvature, which may be represented in a table by estimating the location of a mid point for a second order or other order approximation of the curve with a polynomial or by other mathematical techniques.

Image processing in symbolic space according to an aspect of the present invention may also include developing a map of the relationship between two images identified as being adequately similar. Determining the similarity of two images is discussed further below, but in order to align and compare the figures, the difference in magnitude and orientation must be considered, e.g., by mapping. An approach to mapping the two sets of primitives in symbolic space with mathematical techniques is now described.

Given two sets of symbolic primitives $p_1$ and $p_2$, we want to find a mapping operator M. Under this the error will be minimized:

$$\text{error} = \underset{M}{\text{minimize}} \; |M(P_2) - P_1| \tag{53}$$

To find mapping operator M, multivariate multiple regression can be applied as follows:

$$P_2 = MP_1 + \epsilon \tag{54}$$

and $$\hat{M} = (P'_1 P_1)^{-1} P'_1 P_2$$

For most applications, one only needs to consider rotation, scale and translation of the images. After considering the texture (color or gray scale) information, the analysis may be simplified as follows:

$$u = ax - by + g_x + \epsilon_x$$
$$v = bx + ay + t_y + \epsilon_y \tag{55}$$

The error function, E, to be minimized is:

$$E = \sum_i e_i^2 = \sum (\epsilon_{x_i}^2 + \epsilon_{y_i}^2) \tag{56}$$

$$= \sum_i [(ax_i - by_i + t_x - u_i)^2 + (bx_i + ay_i + t_y - v_i)^2]$$

Taking the partial derivatives of E with respect to u, b, $t_x$ and $t_y$:

$$\begin{cases} \dfrac{\partial E}{\partial a} = \sum_i 2[(ax_i^2 + x_i(t_x - u_i) + ay_i^2(t_y - v_i)] \\[4pt] \dfrac{\partial E}{\partial b} = \sum_i 2[by_i^2 - y_i(t_x - u_i) + bx_i^2 + x_i(t_y - v_i)] \\[4pt] \dfrac{\partial E}{\partial t_x} = \sum_i 2[(t_x - u_i) + ax_i - by_i] \\[4pt] \dfrac{\partial E}{\partial t_y} = \sum_i 2[(t_y - v_i) + bx_i + ay_i] \end{cases} \tag{57}$$

Let $$S_x = \sum_i x_i, \; S_y = \sum_i y_i, \; S_u = \sum_i u_i, \; S_v = \sum_i v_i \tag{58}$$

$$S_{xx} = \sum_i x_i^2, \; S_{yy} = \sum_i y_i^2, \; S_{xu} = \sum_i x_i u_i, \; S_{yv} = \sum_i y_i v_i$$

We have $$\frac{\partial E}{\partial a} = aS_{xx} + t_x S_x - S_{xu} + aS_{yy} + t_y S_y - S_{yv} \tag{59}$$

$$\frac{\partial E}{\partial b} = bS_{yy} - t_x S_y + S_{yu} + bS_{xx} + t_y S_x - S_{xv}$$

Setting $$\frac{\partial E}{\partial t_x} \; \text{and} \; \frac{\partial E}{\partial t_y}$$

equal to zero and substituting for $t_x$ and $t_y$ gives the following:

$$t_x = \frac{1}{n}(S_u + bS_y - aS_x) \tag{60}$$

-continued $$t_y = \frac{1}{n}(S_v - bS_x - aS_y)$$

Setting $$\frac{\partial E}{\partial t_x} \text{ and } \frac{\partial E}{\partial t_y}$$

equal to zero and substituting for $t_x$ and $t_y$ to solve for a and b yields the following:

$$a = \frac{n(S_{xu} + S_{yv}) - (S_u S_x + S_y S_v)}{n(S_{xx} + S_{yy}) - (S_x^2 + S_y^2)} \quad (61)$$

$$b = \frac{n(S_{xv} - S_{yu}) + (S_u S_y - S_x S_u)}{n(S_{xx} + S_{yy}) - (S_x^2 + S_y^2)}$$

This technique may be used to match or compare two images representing primitives having different rotations, different scales or translations.

Another powerful form of image processing in symbolic space that may be conducted by system 40 is the grouping of tokens into higher level image primitives. For example, in a number of applications it may be desirable to group various segments or images to form higher level primitives. One example is in decomposing an aerial photograph for the purpose of developing a map such as a road map. In accomplishing such a task, it may be desirable to group certain images such as grouping shrubbery or trees. Referring to FIG. 10, an image 160, which is composed of a plurality of line segments in relatively close proximity is shown. Image 160 of scope-of-view window 162 has already been decomposed into image primitives, but is being shown as a display for discussion of the processing steps that might be used for grouping image primitives to form higher level primitives.

Circular operator window 164 may be used to group segments that collectively form image 160. Operator window 164 performs a search pattern in scope-of-view 162 similar to that previously discussed, but upon locating a segment of image 60, the perimeter of circular operator window 164 will contact the segment at one point, i.e., at a tangent point, to the particular segment. The operator window 164 will then rotate about the tangent point seeking another line segment within the diameter of operator window 164. If another segment is found, operator window 164 will move to the next line segment establishing a tangent point contact with it. This process continues as operator window 164 rotates from one segment to the next, while attempting to trace the outermost border. The process may have a preprogrammed bias to circle to the left (of course, it could be programmed to process to the right or both as well) of a pattern. Additionally, in analyzing its next segment to move to within the rotation about the tangent point of operator 164, the texture of the next segment is also considered. If the texture is approximately the same, the operator window 164 will move to the next segment as discussed.

Figure 11:
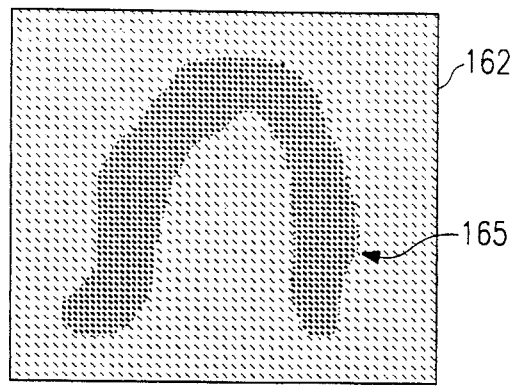
FIG. 11 is the resultant trace outline of the line segments of FIG. 10.

If the tracking or passing of operator window 164 successfully completes a closed pattern about the border of an image, such as image 160, the image may be reduced to a representation shown by the trace that the center point of operator window 164 has made, but moved inwardly to account for the radius of operator window 164. Additionally, the average texture for the portions to the left and right of the individual line segments considered by operator window 164 as it is passed, may be stored as the texture interior to the border traced by operator window 164. Thus, the trace of FIG. 10 may be represented as image 165 as shown in FIG. 11. The number of primitives necessary to represent image 165 of FIG. 11 is substantially less than those required to represent the individual segments forming image 160 of FIG. 10. Thus, grouping image primitives according to this technique may further reduce the memory required and/or the processing time required to manipulate an image.

Aspects of the present invention may allow for the storing and learning of images in primitive format as part of a knowledge base, e.g., 56 of FIG. 2. The information on the objects or structures in an image may be stored in the knowledge-base in the form of constraints on the object attributes, or its grammars:

$$G = [g_1, g_2, \ldots, g_m] \quad (62)$$

where $g_1$ is a set of symbolic primitives which have the same format as previously described above. In seeking to match or identify an image, after an image y is decomposed into primitives such that:

$$P = [p_1, p_2, \ldots, p_m] = S(Y) \quad (63)$$

the symbolic primitives $p_1, p_2, p_m$ which belong to p, should be found in the knowledge-base, i.e., matched to G.

One approach for matching the image primitives with the primitives in the knowledge-base, which may be referred to as grammar primitives, is to consider an error function for the shape and for the texture of the image. Given the tolerances for shape difference $\epsilon_p$ and texture difference $\epsilon_t$, the symbolic images of two objects match if their shape difference is less than a predetermined threshold $\epsilon_p$ and their texture difference is less than a predetermined threshold $\epsilon_t$.

Given the statistical value tolerance $\epsilon_s$ and texture difference tolerance $\epsilon_t$, two symbolic primitives $p_1$, $p_j$ are similar if $$|P_i^{STAT} - P_j^{STAT}| < \epsilon_s \quad (64)$$

and $$|P_i^{TEX} - P_j^{TEX}| < \epsilon_t.$$

If $p_i$, $p_j$ are similar, they may be denoted as $p_i \sim p_j$. The geometric distance between two symbolic primitives is:

$$d = \sqrt{\left(\frac{(P_i^{spx} + P_i^{epx}) - (P_j^{spx} + P_j^{epx})}{2}\right)^2 + \left(\frac{(P_i^{spy} + P_i^{epy}) - (P_j^{spy} + P_j^{epy})}{2}\right)^2}. \quad (65)$$

If $G = [g_1, f_2, \ldots, g_m]$ and $p = [_1, _2, \ldots, p_m]$ are two images in symbolic space, the shape distance between the two images is the mean of the distances between corresponding pairs of symbolic primitives; that is, $$D = E(d_i + R) = \frac{1}{n} \Sigma d_i, \quad (66)$$

where R is random error, assuming $E(R) = 0$, $Var(R) = \sigma^2$.

If only translation has occurred between the two images, there would be no direct relationship between the shape distance and the similarity of the two images. Furthermore, if only translation occurred between the two images, the variance would be zero when the two images are exactly matched. The standard deviation of D can be used to measure the shape similarity between the two images. This technique may be used to identify a specific known object which has a fixed shape within the image. The comparison of images may also be accomplished by using other techniques. For example, consider the following illustration. An image that is being converted to image primitives, and that may have been converted to higher level image primitives such as image 165 of FIG. 11 may be compared with primitives in a knowledge base. For purposes of the example, let the image primitives representing the captured image be represented by the following string: [0.7, −1.8, 0.6, 0.9, −2.3, −1.1, 0.3]. A search of the grammar primitives in the knowledge base is performed looking for an acceptable match for the image search string with a numeric search. Because the "real" numbers of the image string are approximate, the search may be called a "fuzzy" numeric string search. If an object in the knowledge base is represented by the following object string: [0.55, 0.88, −2.1, −1.2], a match may nevertheless be found for the object string with respect to the third through sixth position of the image search string.

This type of "fuzzy" numeric string searching may also be used with the processor in analyzing the primitives to account for search values that are partitioned differently in the two strings. For example, if the search string is [0.7, −1.8, 0.6, 0.9, −2.3, −1.1, 0.3] and the object string is [−1.9, −1.54, −2.2], a match is obtained for positions 2 through 6 of the search string. The third and fourth positions of the search string match with the value 1.54 of the second position of the object string because the addition of 0.6 and 0.9 is 1.5 which approximately matches to be 1.54 value of the second position of the object string.

There are two manners for adding to a knowledge based used as an aspect of the present invention. The first is by entering a previously defined standard into the knowledge base in the form of an explicit grammar. An explicit grammar is, for example, the entry of computer aided design (CAD) files into image grammars or grammar primitives which are added to the knowledge base. For example, the CAD image of a circuit design may be used to compare with an actual image of a circuit decomposed into image primitives as previously discussed in order to locate and classify defects. Similarly, explicit grammars may be composed or defined by experts and entered into the knowledge base.

The other method of entering grammar primitives into the knowledge base is with implicit grammars. Implicit grammar entry into the knowledge base is accomplished when, for example, the particular image, which has already been decomposed into image primitives, is identified by an operator and entered into the knowledge base. Thus, for example, if a circle is decomposed to image primitives, the operator could instruct that the image primitives representing the circle be labeled "circle" and entered into the knowledge base. In the "fuzzy" search through the knowledge base, a circle might then be identified if it matched the saved primitives for the learned circle within a predetermined error threshold.

An aspect of the apparatus and method for image processing of the present invention may include processing groups of image primitives. Appropriate pattern sets or sets of grammar primitives may be identified and grouped in the knowledge base; for example, a pattern set may be identified as a grouping of grammars as follows:

$$G=\{G^{(1)}, G^{(2)}, \ldots, G^{(k)}\}. \tag{67}$$

An object may be identified as the kth pattern:

$$P^i=\{P_{i1}, P_{i2}, \ldots, \} \in P \tag{68}$$

and $$\max_{k} \Pi(P^i, G^{(k)})), \tag{69}$$

where $\Pi$ may be a similarity function. This technique may be used, for example, in optical character recognition. See below for an example of an optical character recognition embodiment.

Figure 12:
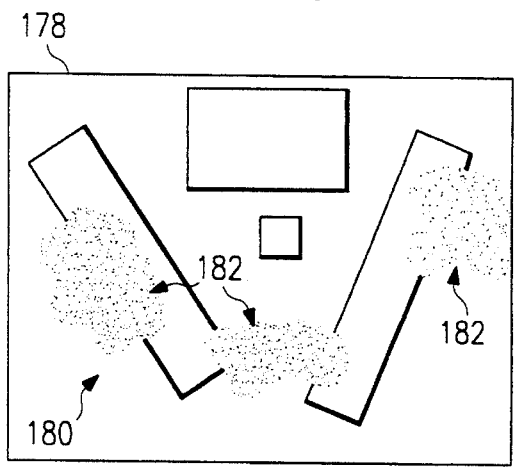
FIG. 12 is a simplified image of an airport with portions occluded by cloud cover.
Figure 13:
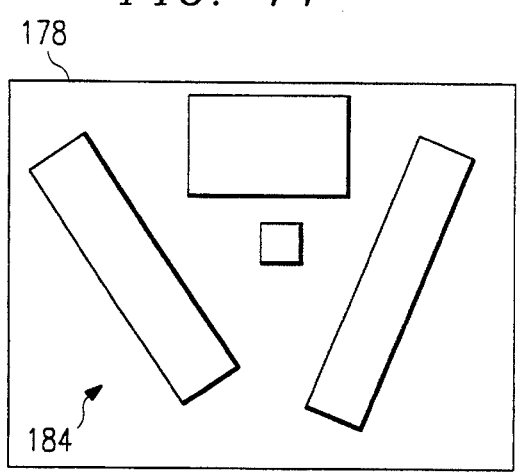
FIG. 13 is the airport of FIG. 12 with an enhanced image according to an aspect of the present invention.

An additional aspect of the present invention includes a method and apparatus for image processing in symbolic space to enhance the image. Referring to FIGS. 12 and 13, the most basic images of a simplified image of an airport are shown. Image 180 shown in scope-of-view window 178 of FIG. 12 may be decomposed into image primitives according to the aspects of the invention previously discussed. There are, however, clouds 182 obscuring portions of the airport. If, as an example, it was desirable for a clear image to be produced of the airport without the appearance of the clouds, such as to help orient a pilot, a search through a knowledge base of existing airports which includes the particular airport of image 180, which may be based on the longest line segments in the figures being compared, would allow a match to be made except for some error caused by the clouds 182. Because of the difference in texture of the clouds 182, the processor may be instructed to remove items with that specific texture and to infer the missing portions of the image based on previously captured images in the knowledge base. Thus, image 180 may be represented as image 184 of FIG. 13. The same technique may be used to infer the identity of ships in fog where the silhouette or shape information of the ship is previously stored in the knowledge base.

Aspects of the present invention are discussed herein with reference to two-dimensional figures, but it is to be understood that aspects of the present invention may be used with three-dimensional objects as well. The approach to three-dimensional objects is largely analogous. Furthermore, while various data analyses and processing steps of the images in symbolic space have been discussed, aspects of the present invention may also be used for image data compression. This subarea of digital image processing addresses the efficient coding of picture data in order to save storage space or channel capacity. The image can be represented as symbolic primitives in vector format as previously discussed, which contain most of the essential information of the original image. Thus, the image may be substantially restored based on the image primitives which require much less information than pixel maps. For example, the image primitives may store information concerning a particular line segment in the image and the texture of the line and the area adjacent to the line and only require that information to restore the line.

The apparatus and method for processing images in symbolic space of the present invention may entail capturing an image, converting it to image primitives, and processing the image primitives in symbolic space as desired. This method of processing images in symbolic space may be carried out by an apparatus such as that shown in FIG. 3. The apparatus and method of the present invention may have numerous applications in different areas as previously mentioned. Two examples of the application of aspects of the present invention in two specific areas are presented below: (1) in a system and method for recognizing visual indicia and (2) in an apparatus and method for aligning and measuring misregistration in the fabrication of integrated circuits.

SYSTEM AND METHOD FOR RECOGNIZING VISUAL INDICIA

Figure 14:
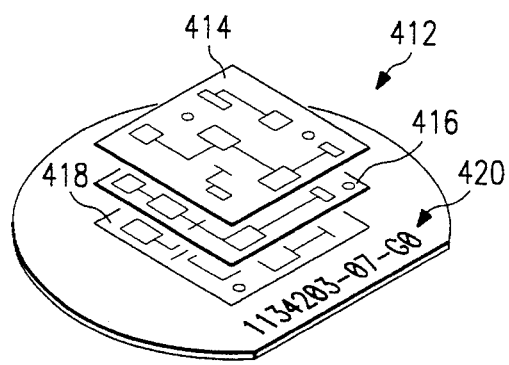
FIG. 14 is a schematic representation, in section and elevation with portions broken away, of a semiconductor wafer with layers of an integrated circuit and an identifier shown thereon.

Referring to FIG. 14, there is shown a semiconductor wafer 412. Wafer 412 may be formed from silicon. In the fabrication process, a stepper camera (not shown) may be used in a photolithography process to fabricate a series of layers 414, 416, and 418 of an integrated circuit on wafer 412. Layers 414 through 418 may be formed through the use of selective photoresist and doping compounds. A given layer, such as 414, may represent numerous steps in the fabrication process. Silicon wafer 412 is shown with a thirteen character identifier 420. Various combinations of alphanumeric characters may be satisfactorily used with the present invention as identifiers.

Identifier 420 allows wafer 412 to be tracked as it progresses through the fabrication process. Identifier 420 may be in the form of SEMI font characters as is standard in the art of fabricating integrated circuits, but other font systems may be satisfactorily used with the present invention. Any visual indicia or markings may be used for identifier 420. This embodiment of an aspect of the present invention may be used in the fabrication process to allow a machine to read identifier 420 and to store information about wafer 412 or recall information, such as a recipe, that may be needed for a particular step in the fabrication process for that particular wafer 412.

Figure 15:
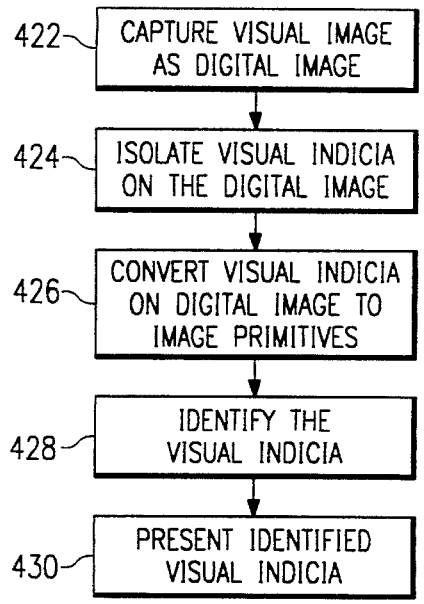
FIG. 15 is a block diagram of steps that may be used to allow a machine to read to a visual indicia or identifier.

The basic steps that may be used to read (scan and identify) visual indicia on an item, e.g., identifier 420 on wafer 412, is depicted in the flow chart of FIG. 15.

The basic steps are as follows:

Step 1 (block 422): capture a visual image containing visual indicia, e.g., of identifier 420, as a digital image;

Step 2 (block 424): isolate the visual indicia on the digital image;

Step 3 (block 426): convert the visual indicia to image primitives or image tokens;

Step 4 (block 428) compare the visual indicia with known visual indicia in a grammar database and select the closest match; and Step 5 (block 430) present the identified visual indicia.

As previously described, primitives are basic building blocks for representing data in a compressed format; for example, a two-dimensional circle may be represented by two primitives: one representing the center point and one representing the radius. Thus, if a circle is to be stored in memory for comparison purposes, it does not have to be stored as a bit map, but may be stored as a 1*2 matrix.

The first basic step (block 422) of capturing the visual image that contains the visual indicia of identifier 420 as a digital image may be accomplished by using a camera 431 and a video-to-digital converter 433. See FIG. 16. For example, a charge coupled device (CCD) camera, e.g., SONY X57C, may be used to capture the visual image. The CCD camera may be coupled to a video digitization board, e.g., True Vision Targat Board, to convert the visual image to a digital image. The digital image may then be received by a computer 435 with a processor, appropriate memory and software to accomplish the remaining steps shown in FIG. 15.

Figure 17:
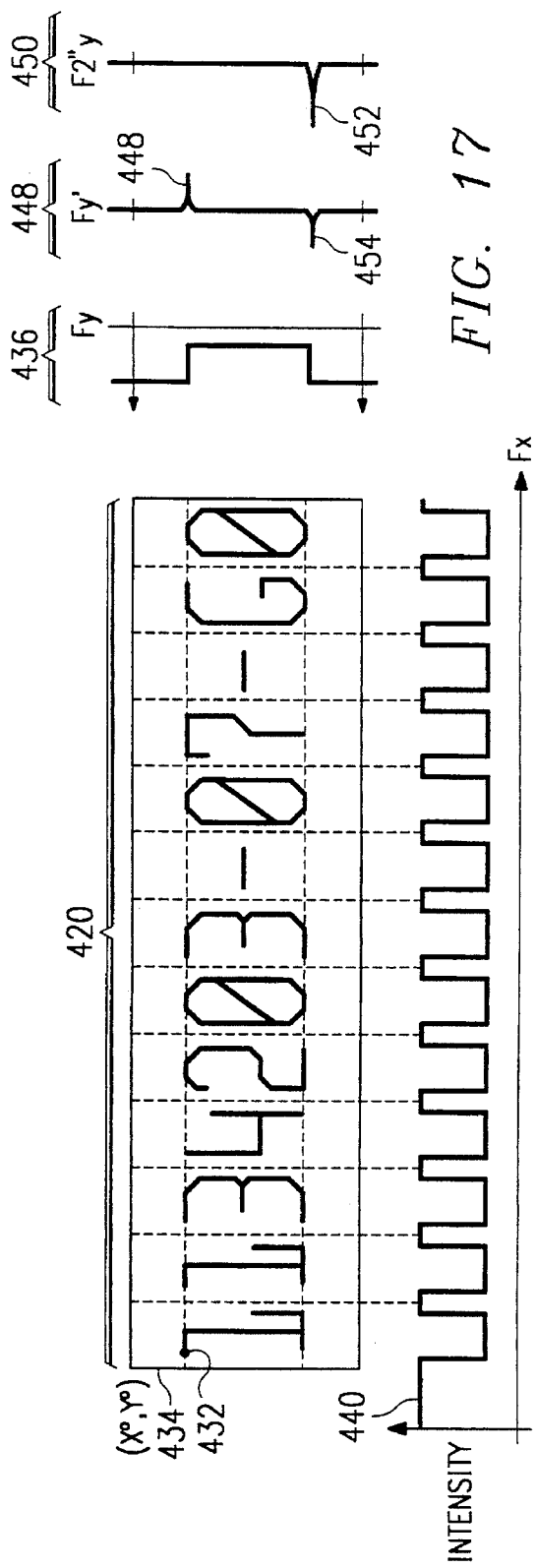
FIG. 17 shows a scope-of-view window in which appears an enlarged plan view of the identifier shown in FIG. 14.
Figure 18:
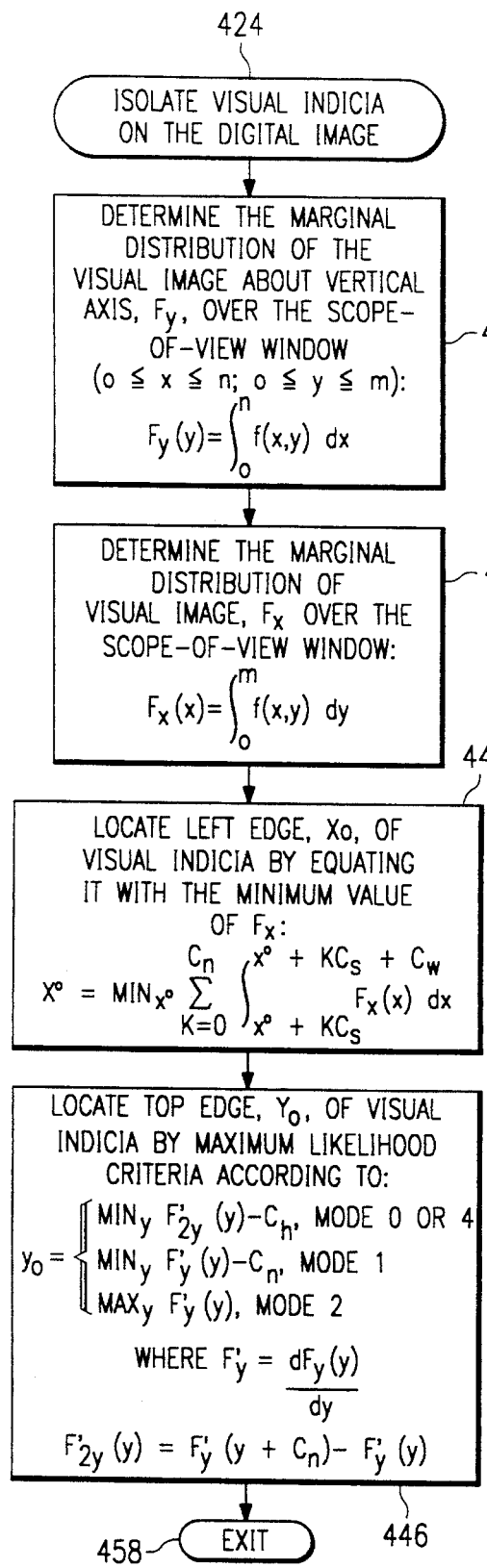
FIG. 18 is a block diagram showing steps that may be used to isolate visual indicia on a digital image in accordance with an aspect of present invention.

The second basic step (block 424) requires that the digital image of the visual indicia 420 on wafer 412 be isolated. To accomplish this, a scope-of-view window 434 is centered over the visual indicia of identifier 420, as shown in FIG. 17. Identifier 420 for silicon wafer 412 may be in a SEMI font which has standard character width, $C_w$, character height, $C_h$, and character spacing, $C_s$. Thus, by locating a reference point, e.g., the upper left-hand corner 434 $(x^0, y^0)$ of the image, the remaining portion of identifier 420 may be determined. Statistics and differential equations may be used to locate the upper left-hand corner 434 of identifier 420. The visual image of the identifier is designated $Y=f(x,y)$ over the scope-of-view window 434 $(0 \leq x \leq n; \ 0 \leq y \leq m)$, where the X axis is horizontal and the Y axis is vertical.

To locate corner 434, the marginal distribution about the Y axis, $F_y$, is determined (block 438 of FIG. 18) according to the equation:

$$F_y(y) = \int_0^n f(x,y)dx \tag{70}$$

A schematic plot of the ideal marginal distribution $F_y$ is designated 436 in FIG. 17. Similarly, the marginal distribution about the X axis, $F_x$, is determined (block of FIG. 18) according to the equation:

$$F_x(x) = \int_0^m f(x,y)dy \tag{71}$$

A schematic plot of the ideal marginal distribution $F_x$ is designated 442 in FIG. 17. The x position of corner may then be determined (block 444 of FIG. 18) by determining the minimum x value for the visual image according to the equation:

$$X^0 = Min_{x^0} \sum_{K=0}^{C_h} \int_{x^0+(K*C_s)}^{x^0+(K*C_s)+C_w} Fx(x)dx \tag{72}$$

The y value of corner 434 is determined (block 446 of FIG. 18) using maximum likelihood criteria. See generally, William Mendhall, Richard Scheaffer, and Dennis Wackery, *Mathematical Statistics with Applications* (1981), which is incorporated herein for all purposes. In step 446, the first derivative of the marginal distribution $F_y$ is determined according to the equation:

$$F'_y(y) = \frac{dF_y(y)}{dy} \tag{73}$$

Next, an intermediate equation is defined as follows:
If the visual image of identifier 420 is perfect, the plot of $F'_y$ will appear as shown by schematic plot 448 in FIG. 17 and $F''_{2y}$ will appear as shown by schematic plot 450 in FIG. 17. Once $F_y$, $F'_y$, and $F'_{26}$ are determined, the y value, $y^0$, of corner 434 may determined using maximum likelihood criteria according to the equation:

$$Y^0 = \begin{cases} Min_y F_{2y}(y) - C_h & \text{Mode 0 or 4} \\ Min_y F'_y(y) - C_h & \text{Mode 1} \\ Max_y F_y(y) & \text{Mode 2} \end{cases} \tag{75}$$

Mode 0 is designated by reference numeral 452, mode 1 is designated by reference numeral 454, and mode 2 is designated by reference numeral 456 in FIG. 17. Once this corner $(X_0, F_0)$ is located, the known character dimensions and general orientation allow all of identifier 420 to be located. Having isolated the visual image of visual indicia 420 (block 458 of FIG. 18), the next step of FIG. 15 is considered.

Another basic step (block 426) in a process of the present invention is to convert the isolated visual image into image primitives or tokens.

Figure 19:
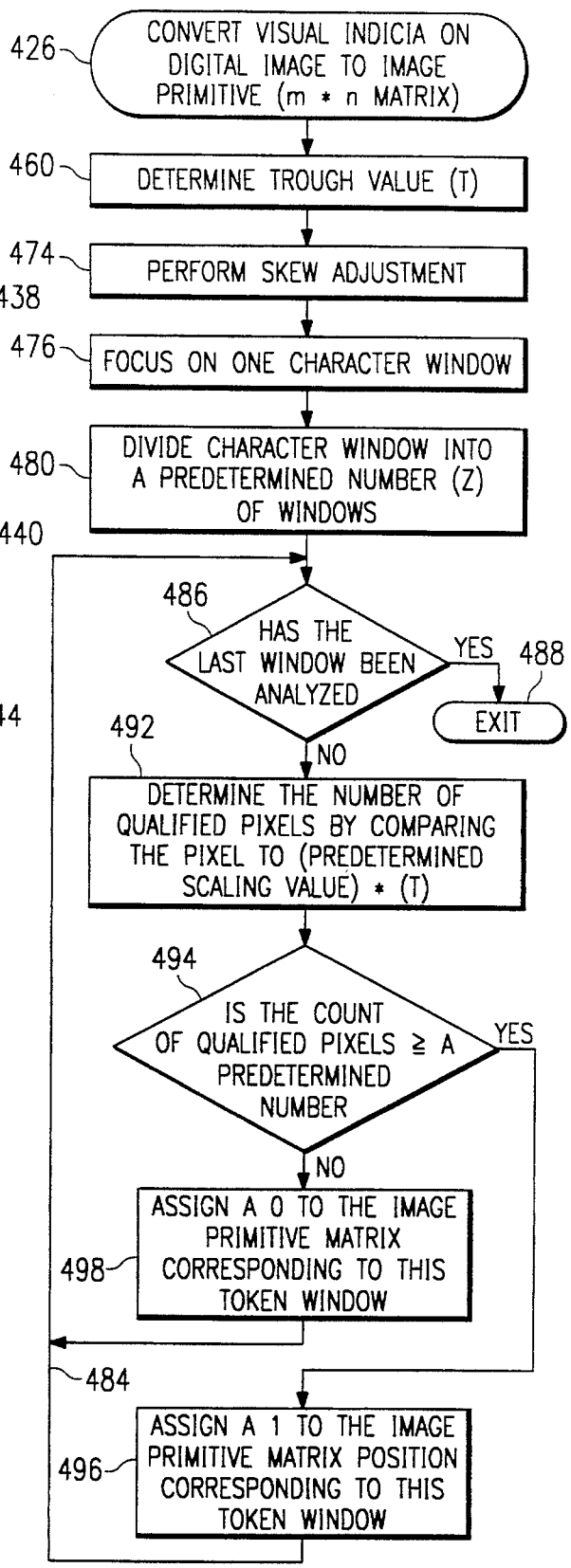
FIG. 19 is a block diagram showing steps that may be used to convert a visual indicia on a digital image to image primitives in accordance with an aspect present invention.

Referring to FIG. 19, the basic steps that may be used to convert visual indicia for identifier 420 of the digital image to image primitives is shown. A first step (block 460) in the conversion is to determine a trough value 462. See FIG. 21.

This aspect of the conversion involves a statistical analysis of scope-of-view window 434 to separate visual indicia 420 from the background. The trough may be thought of as representing an intermediate point between the most frequent intensity of background 470 and most frequent intensity 472 of visual indicia 420, where intensity may be measured on a gray scale of 0–255. To determine the trough value (T) 462, a histogram for the intensity of the scope-of-view window 434 may be determined.

Figure 20:
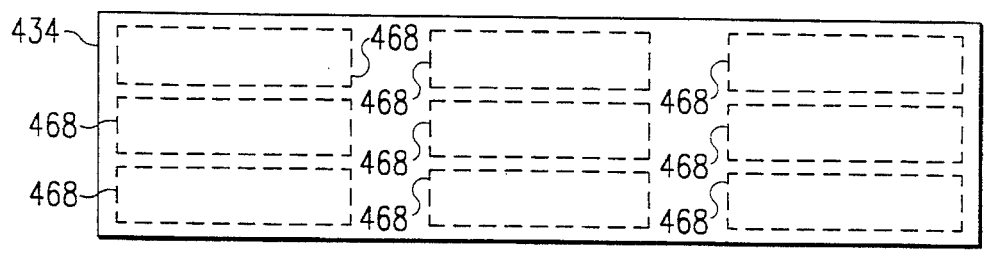
FIG. 20 shows the scope-of-view window of FIG. 17 with nine sample sites shown with phantom lines.
Figure 21:
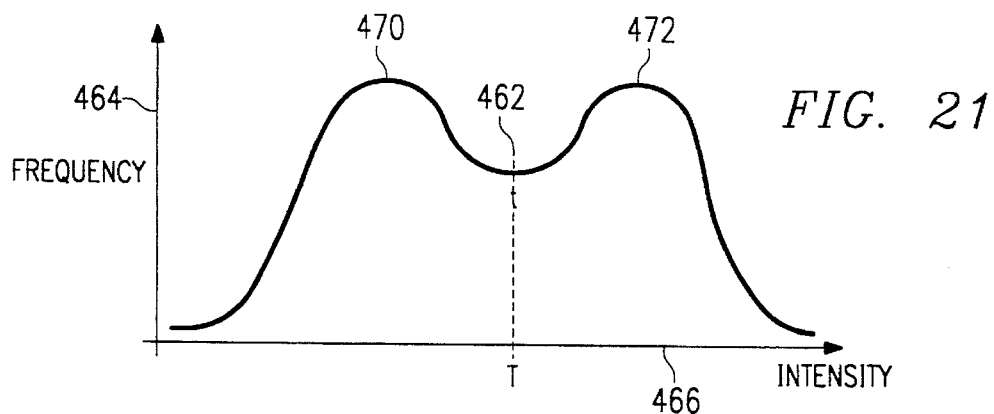
FIG. 21 shows a schematic diagram of a plot of the frequency of occurrence of various intensities that may be perceived for the sample sites shown in FIG. 20.

FIG. 21 shows a typical histogram according to the present invention. Vertical axis 464 represents the frequency with which a specified intensity (specified on horizontal axis 466) occurs for a sampling of scope-of-view window 434 at predetermined number of sampling sites 468, e.g., nine sample sites 468 as shown in FIG. 20. The bimodal histogram of FIG. 21 develops because there are predominantly two basic images being viewed: the visual indicia and the background. The trough value (T) 462 may be used to predict whether a given area of the scope-of-view window represents the visual indicia or the background.

The trough value (T) 462 may be determined by first dividing scope-of-view window 434 into a predetermined number of sampling sites 468 (FIG. 20). The trough value for each sampling site 468 may be determined according to the equation:

$$Ti = \frac{\int_{y^0}^{y^0+C_h} \int_{x^0}^{x^0+\frac{C_h}{3}*C_s} f(x,y)dxdy}{\int_{y^0}^{y^0+C_h} \int_{x^0}^{x^0+\frac{C_h}{3}*C_s} dxdy} \quad (76)$$

The trough value (T) 462 is determined by interpolating from the trough values for the sampling sites 468 according to the equation:

$$T = at_{i-1} + (1-a)t_{i+1} \quad (77)$$

where $0 \leq a \leq 1$.

The next step in converting the visual image to primitives involves analyzing each character of identifier 420, but before doing so, it may be desirable in some circumstances to adjust alignment of the scope-of-view window 434 to account for skew that may be due to machine handling or random errors. This is accomplished at block 474 of FIG. 19 by considering the number of pixels shifted vertically between two nearby characters.

Figure 22:
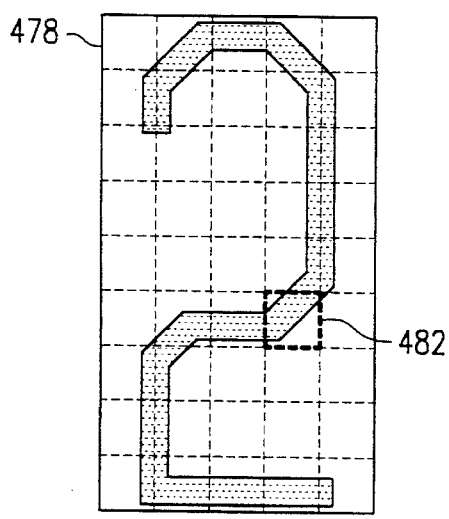
FIG. 22 is a schematic diagram showing a character window with the character "2" therein.

Each character of identifier 420 is considered one at a time (block 476 of FIG. 19) by focusing on each character with a character window 478. Referring to FIG. 22, character window 478 may then be divided into a predetermined number of smaller windows (block 480 of FIG. 19), which may be referred to as token windows 482. A representative token window 482 is shown in FIG. 22. The conversion to primitives proceeds for each token window 482 of character window 478 as indicated by loop 484 and decision point 486 of FIG. 19. Each token window 482 may be represented as a primitive which in this application is either a "1" or a "0" according to criteria discussed below. The primitives for each character may thus be represented as an i*j array or matrix of zeros and ones. For example, character window 478 of FIG. 22 is shown divided into 45 token windows 482 and thus the character in window 478 may represented by a 5*9 matrix of zeros and ones.

Each token window 482 is analyzed to determine whether the appropriate primitive should be a one or a zero. To make this determination the number of qualified pixels or bits is determined (block 492 of FIG. 19) for token window 482. A qualified pixel bears a specified relationship to trough value (T) 462; the typical relationship requires that the pixel have an intensity between Trough value (T) 462 and the most frequent intensity of visual image 472. A scaling value may be used to place less reliance on intensities that are near trough value 462, i.e., scaling value *T. The number of qualified pixels for window 482 is compared with a predetermined number, a threshold valve, (decision point 494 of FIG. 19), which may be a percentage of the number of pixels in a given token window 482. If, for example, the majority of pixels in a token window 482 are qualified pixels, the token window will be assigned (block 496 of FIG. 19) a primitive representing that visual indicia is primarily the contents of token window 482. If a "1" signifies that primarily visual indicia exists in window 482 and "0" signifies that primarily background exists in window 482, a "1" would be assigned the described token window 482.

Figure 23:
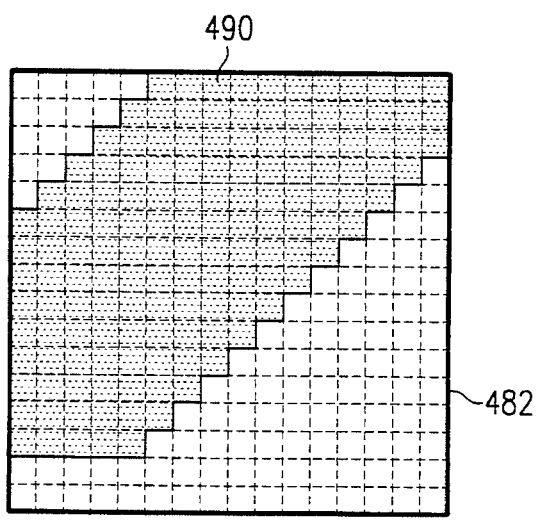
FIG. 23 is a schematic diagram of a token window for a portion of the character window shown in FIG. 22.

Consider token window 482 shown in FIG. 23. Token window 482 in this example has 256 pixels (16×16). Suppose that each of darkened pixels 490 has an intensity corresponding approximately to region 472 on the histogram of FIG. 21. Say that the relationship required for a pixel to be a qualified pixel is that the pixel have an intensity greater than 1.2 *T and assume that the intensity of 472 is greater than 1.2 T so that all the darkened pixels of FIG. 23 are qualified pixels. Approximately 146 of the 256 pixels in token window 482 of FIG. 23 are qualified. Then assume the predetermined number to which the qualified pixels is compared is half the number of pixels in token window 482. Thus, because 146 is greater than 128, the conclusion is reached is that the token window is primarily visual indicia and a "1" is assigned for the primitive representing this token window (block 496 of FIG. 19). If less qualified pixels existed in window 482 than the predetermined number, a "0" would have been assigned (block 498 of FIG. 19). This process is repeated for each token window 482 of the character of visual indicia 420 until all token windows 482 are considered and the character in character window 478 is represented as a matrix of ones and zeros, i.e., as image primitives. The conversion of the visual indicia to image primitives is then complete (block 488 of FIG. 19).

Figure 24:
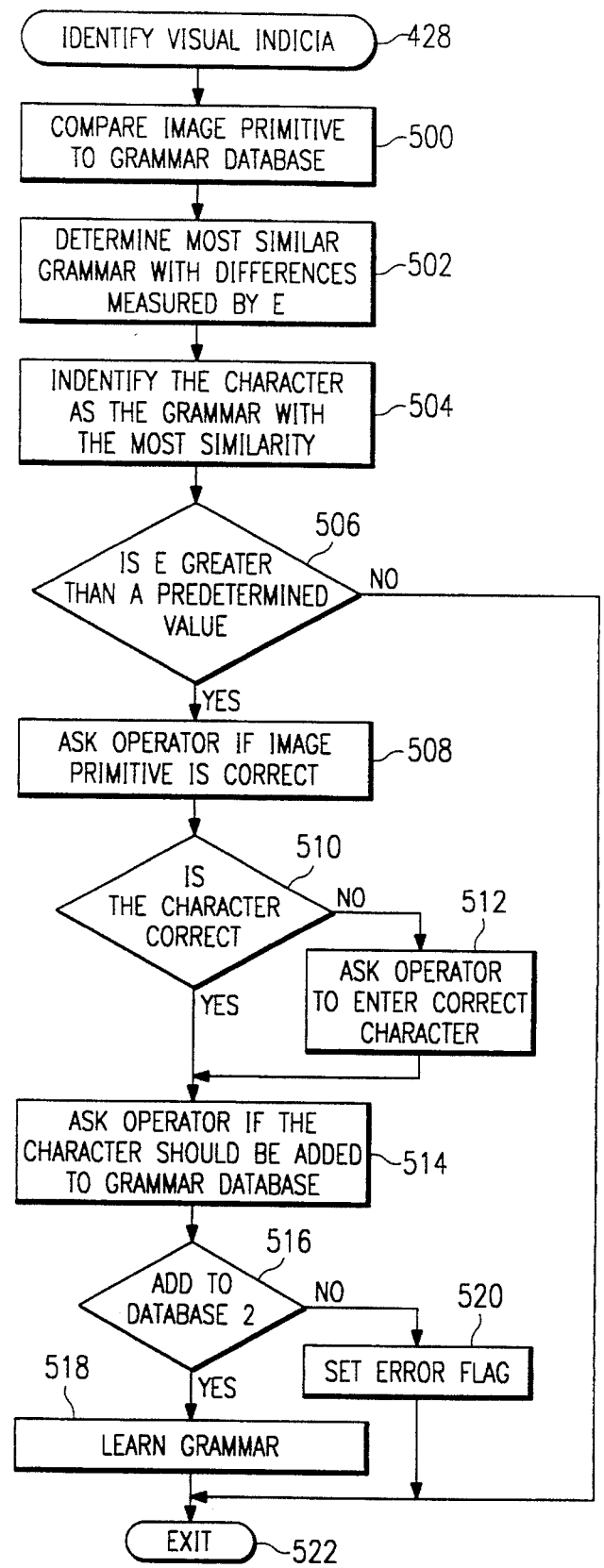
FIG. 24 is a block diagram showing the steps that may be used to identify visual indicia in accordance with an aspect of the present invention.

The next basic step (block 428 of FIG. 15) is to identify the character or visual indicia 420. FIG. 24 shows the flow of steps that may be used to identify visual indicia 420. At this point, the contents of character window 478 are now represented as image primitives, P, in the form of an i*j matrix. To identify the character represented by the image primitives, P, the primitives P are compared with a plurality of known visual indicia that have been represented as primitives. The plurality of known visual indicia form a token grammar database. Each grammar, $G_i$, is a known visual indicia, such as a character, that is represented as an i*j matrix of primitives: zeros or ones according to the scheme and matrix format discussed above.

At this point, the grammar of the grammar database that is most similar to the image primitives of visual indicia 420 may be determined by comparing the image primitives with each grammar in the data base or knowledge base (block 500 of FIG. 24). A binary add is used to calculate an error count, E, for each comparison, and then the comparison having the least error is determined (block 502 of FIG. 24), and the grammar with the least error is identified as the indicia (block 504 of FIG. 24). Thus, if the grammar database is defined as $G = \{G^{(.)}, G^{(-)}, G^{(0)}, G^{(1)}, \ldots, G^{(9)}, G^{(A)}, G^{(B)}, \ldots, G^{(z)}\}$ where the superscript shows the visual indicia represented in that set of tokens as primitives, then the identity of the character C in the character window 478, which has been represented by a primitive matrix P, would be C=G(c)|min$_c$ E(P,G(c)), where E is the error function defined as $$E(P, G_c) = \sum_{i,j} \overline{(P_{ij} \oplus g_{ij})} * W_{ij} \quad (78)$$

where W is a weighing function to account for areas where the character information is less reliable. The error function keeps a count of the number of differences between each comparison. The weighing function may be defined as $$W_{ij} = \begin{cases} 0.5 \text{ if } (g_{i,j+1} + g_{i+1,j} + g_{i,j-1} + g_{i-1,j}) > 2 \text{ and } p_{ij} = 1 \\ 1 \text{ otherwise} \end{cases} \quad (79)$$

For a simplified example, suppose P is 1*3 matrix: P=[1 0 1] and the grammar database, G, contains two characters $G^{(1)}$=[1 1 1] and $G^{(2)}$=[0 1 0]. Then the comparisons would be as follows:

```
P           = 1 0 1
G⁽¹⁾        = 1 1 1
binary add  = 0 1 0 = 1
``` perform binary add for P and $G^{(2)}$:

```
P           = 1 0 1
G⁽²⁾        = 0 1 0
binary add  = 1 1 1 = 3
```

$E(P, G^{(1)}) = 1 * W_{ij}$ $E(P, G^{(2)}) = 3 * W_{ij}$

Thus, because $[E(P,G^{(1)})=1*W_{ij}] < [E(P,G^{(2)})=3*W_{ij}]$, it is clear that $G^{(1)}$ has the better match and character C would be identified as the numeral "1" assuming the error function was less than a predetermined value, a maximum error value.

There may be occasions, however, where the best match of the image primitives and the grammar primitives in the grammar database are not acceptable. To determine when this case exists, the error of the best match is considered and compared with a predetermined number, the maximum error value (decision point 506 of FIG. 24). If the error is greater than the predetermined limit, the operator may be asked if the character identification is correct (blocks 508 and 510 of FIG. 24). If the identification is not correct, the operator may be asked to enter the correct identification of the character (block 512 of FIG. 24).

The operator may then choose (blocks 514 and 516 of FIG. 24) to have the images primitives learned (block 518 of FIG. 24). To learn the indicia, the image primitives associated with visual indicia identified by the operator may be saved as an additional set of grammar tokens for that character in the grammar database, i.e., $G^{(c*)}P$ (where C, indicates that the grammar is an additional set of tokens or grammar primitives representing character C). This procedure allows new grammar sets to be learned to meet new situations, and thus, add to the knowledge base. If the operator chooses not have the image primitive added to the grammar database, an error flag (block 520 of FIG. 24) may be set to indicate that the error was greater than the predetermined maximum error value. The identification of the character or portion of the visual indicia is now complete (block 522 of FIG. 24). An output signal is then generated that corresponds to the identified indicia or character. The output signal may be used to display the character or to transmit the character's identification as input to another machine. The basic steps 426 through 428 are repeated for each character window 478.

Figure 16:
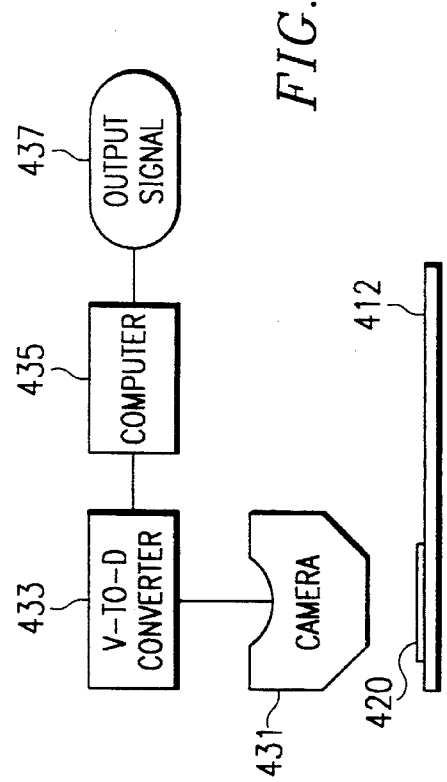
FIG. 16 is a schematic diagram of one aspect of an embodiment the present invention.

Referring to FIG. 16, the process steps of FIG. 15 may be accomplished by an apparatus that has a camera 431 for capturing the visual image; a video-to-digital converter 433 which is associated with the camera 431 for converting the visual image into a digital image; and a computing means 435 that is operable to perform with software steps 424 through 430 of FIG. 15 to produce an output signal 437. A coupler (not shown) may be incorporated to allow output signal 437 to be delivered to other machinery.

The foregoing example of an apparatus and method for recognizing visual indicia is but one example of how the apparatus and method for image processing in symbolic space of the present invention may be used to efficiently process images. Another example of how the method and apparatus for processing images in symbolic space may be applied follows.

APPARATUS AND METHOD FOR ALIGNING AND MEASURING MISREGISTRATION

Referring to FIG. 25, there is shown a schematic representation of an alignment system that may be used in the fabrication process of integrated circuits on silicon wafers. A silicon wafer 620 is carried by stage 622 which is movable in conjunction with a stage adjuster 624, which is coupled to stage 622. During the alignment process, an output signal 626 is produced by computer 628, and output signal 626 may be delivered to stage adjuster 624 so as to reposition stage 622 in response to output signal 626. The substance of output signal 626 may also be displayed by computer 628 on display 630. In order to perform an alignment or misregistration check, computer 628 receives a digital image signal from video-to-digital converter 632. Video-to-digital converter 632 receives a video image signal from camera 634, which is a subsystem of the stepper projection system 636. A stepper 636 is a type of fabrication tool 637. Fabrication tools 637 are used to process wafers.

Referring now to FIG. 26a, there is shown silicon wafer 620 with a reticle layout 640 shown thereon. Exploded section 642 shown in FIG. 26b shows four scribe line segments 644 defining chips 646. Although the pattern formed by the scribe line segments shown in exploded section 642 are uniform, it is to be understood that an exploded view on most all wafers would contain unique line segments.

Referring now to FIG. 27, there is shown a scope-of-view window 648 as may be developed by camera 634 of stepper projection system 636 (FIG. 26). A similar scope-of-view window 648 may be developed by a camera associated with other types of semiconductor wafer fabrication tools. Scope-of-view window 648 shows the intersection of two scribe line segments 644, which contains a vertical line segment 650 and a horizontal line segment 652. The image shown in scope-of-view window 648 may be a digital image of the line segment intersection with a predetermined number of pixels defining scope-of-view window 648. An operator window, kernel, or kernel window 654, which is discussed in detail below, is shown at the lower left-hand corner of scope-of-view window 648.

Referring now to FIG. 28, there are shown the steps of one method by which the symbolic space image processing method might be used to align a wafer in a fabrication tool such as tool 637 of FIG. 25. The first block 656 specifies that grammar template primitives of a target on wafer 620 be produced. This involves capturing a target alignment pattern on a wafer 620 for the particular device to be worked on at a given time by fabrication tool 637. Typically, in setting up a new device to be fabricated, a specific and unique intersection of scribe lines or etchings may be used as an alignment pattern or target. The pattern is captured by a camera 634 converted to a digital signal, and then converted to primitives to form grammar template primitives.

Block 658 specifies that wafer 620 to be aligned is to be placed on stage 622 of fabrication tool 637. Once wafer 620 is placed on stage 622, the alignment system that is built into or used in conjunction with tool 637 can position camera 634 of tool 637 so that a scope-of-view window 648 is centered at the estimated or predicted location of the target, e.g., scribe line 644 intersection of FIG. 27. See block 660 of FIG. 19. Stage 622 is moved to the specified location to within a predetermined scope-of-view tolerance. The specified location may be determined for a test wafer when a process is set up for a given device. While fabrication tool 637 can position scope-of-view window 648 over the target within a specified tolerance, the alignment tolerance (scope-of-view alignment tolerance) built into tool 637 is typically not as precise as desired, and therefore, the alignment system of the present invention is used to further align wafer 620 in tool 637.

The image contained in scope-of-view window 648 is converted to a digital image at block 662. This production of a digital image is accomplished by capturing a video image of the contents of scope-of-view window 648 and using a video-to-digital converter 632 to change the video image into a digital image. As will be discussed in more detail below, the digital image is then converted to image primitives at block 664. The image primitives produced at block 664 typically comprise at least two points and a magnitude or length for each line segment or a predetermined number of line segments contained in the digital image. Thus, the digital image will be represented as image primitives with a list of line segments for which at least two points and a magnitude are given.

The image primitives developed at block 664 are then compared with the grammar template primitives, which are known patterns represented as primitives produced at block 656, in order to determine whether the differences between the image primitives and the grammar template primitives are less than a predetermined similarity threshold at block 666. The comparison at block 666 is described in more detail below, but the general comparison is along the lines of taking the first image primitives that represent a line segment and comparing it to each line segment represented as a set of grammar primitives in the grammar template primitives, and computing an error function value for the comparison. Once the comparison of the image primitives is complete for each line segment in the grammar template primitives, the match with the smallest error function is considered to determine whether it is smaller than a predetermined error threshold value. If it is, a match is noted (i.e., the counter is incremented). If the number of matches after considering a plurality of the line segments is greater than a specified similarity threshold, e.g., 90% for the image primitives match grammar template primitives, the target pattern has been located and additional processing may begin. The threshold is considered at interrogatory block 668 of FIG. 28.

If the answer to interrogatory block 668 is NO, interrogatory block 670 is considered. Interrogatory block 670 asks whether more than a predetermined number of attempts to match image primitives and grammar templates have been made. If the answer to interrogatory block 670 is YES, then the search for an acceptable match is terminated and an error flag is set at termination point 672. Thus, if the target pattern is non-existent or remote from the scope-of-view window 648, the search for the target will terminate after a number of attempts to locate it. If the answer to interrogatory box 670 is negative, the scope-of-view window 648 is repositioned as specified at block 674 and blocks 662 through 668 are repeated. This procedure moves scope-of-view window 648 to where the target is predicted, searches for an adequate match of the image primitives to template primitives, and if it does not find a sufficient match, then moves scope-of-view window 648 in a predetermined search pattern (block 674) in an effort to locate the target. If a sufficient match is found, the answer to interrogatory block 668 will be in the affirmative, and the process continues to block 676.

Block 676 specifies that any rotational misalignment or skew (θ) be determined so that an appropriate output signal may be sent to stage adjuster 624 to correct the rotational misalignment. The operation of block 676 is discussed in more detail below in conjunction with FIG. 29. After adjusting for θ at block 676, the process continues to block 678 where the linear displacement, d, is determined and an appropriate output signal delivered to stage adjuster 624 to correct for linear displacement about a Y-axis and an X-axis. Having corrected for θ and d, the alignment process is complete (termination point 680). Steps 662–680 may be reiterated to further enhance alignment. Furthermore, a number of sample sites 641 (FIG. 26a) may be used to arrive at the best alignment for the wafer as a whole by determining alignment discrepancies at each site 641 and averaging the displacements to develop the necessary correction.

Referring now to FIG. 29 there is shown wafer 620 with a skew or rotational misalignment θ shown by reference numeral 682. During the alignment process discussed in conjunction with FIG. 28 above, at least two points $P_1$ and $P_2$ are found for given line segment, e.g., line segment 684. Line segment 684 is shown at an angle θ 682 from horizontal, but the proper alignment, which is determined by the template pattern, would have line 684 horizontal as shown by the line $T_1$-$T_2$. In order to determine the amount of rotational correction to be sent to stage adjuster 624, the angle θ is determined according to the equation:

$$\theta = \tan^{-1}\left(\frac{dy}{L}\right) \tag{80}$$

where L is the X-component of line segment 684 and dy is the vertical component of line segment 684.

The stepper 636 with 622 can adjust some of the skew, but due to mechanical limitations of the rotational ability of stage adjuster 624, all of θ may not be adjusted to the exact position desired. Further corrections are possible, however, according to one aspect of the present invention. Suppose, for example, the remaining skew is α, let $$V = \tan(\alpha) \tag{81}$$

then skew adjustment can be done by moving in the horizontal direction (X) and the vertical direction (Y) as follows:

$$\Delta X' = \Delta X - V \cdot \Delta Y \tag{82}$$

$$\Delta Y' = \Delta Y - V \cdot \Delta X \tag{83}$$

where ΔX, ΔY are the X axis and Y axis translations needed to move the stage to the correct position and $\Delta_{X'}$ and $\Delta_{Y'}$ are the values after adjustment.

Figure 30:
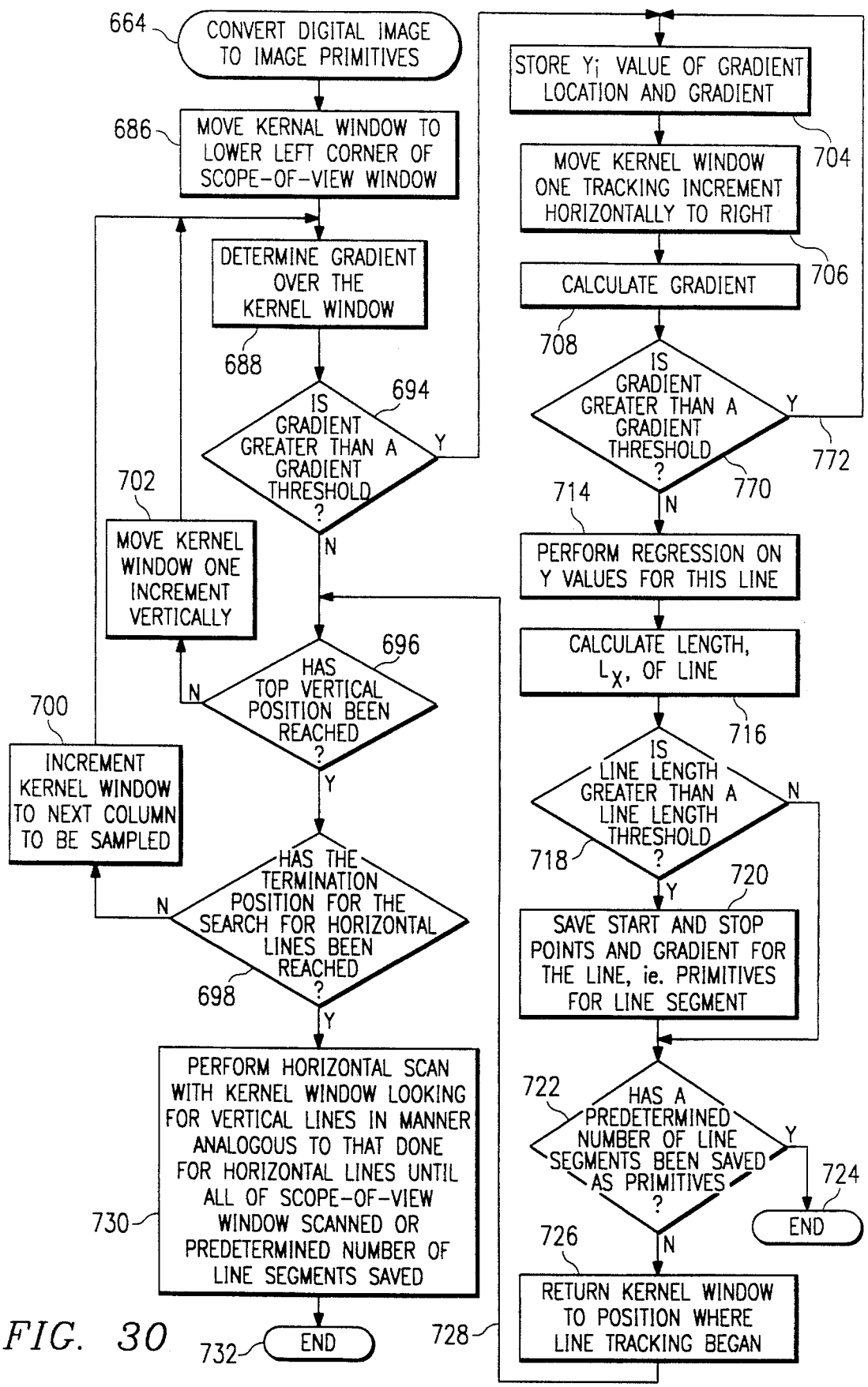
FIG. 30 is a block diagram showing one method for converting a digital image to image primitives according to an aspect of the present invention.

Referring now to FIG. 30, there is shown a block diagram showing in more detail the process for converting a digital image to image primitives (block 664 of FIG. 28) according to one method of the present invention. One method is to conduct a modified Sobel search by using a kernel 654 (see FIG. 27). Kernel 654 is moved to an initial position, which may be, for example, the left lower corner of scope-of-view window 648 as indicated at block 686. It is to be understood that other known search techniques could be used. Generally, the process shown in FIG. 30 moves the kernel vertically to locate horizontal lines and then horizontally to find vertical lines, and upon finding a line, traces it and converts it to image primitives before continuing to scan the window for additional lines. The search for a gradient over kernel 654 begins at block 688.

The intensity, e.g., the gray scale value, for each pixel of the digital image (FIG. 27) is stored in matrix form. The kernel 654 can evaluate whether a gradient exists across kernel window 654; as a simplified representation of how this is done, in a search for vertical lines, the top row of kernel 654 may have the intensity values added for the three boxes of row 690 (shown in FIG. 27) and the three boxes of the lower row 692 of window 654 may likewise be added. The summed intensity of rows 690 and 692 may be compared to determine the gradient that exists between row 690 and row 692. As is the subject of interrogatory block 694, the question is asked whether the gradient that exists across kernel 654 is greater than a predetermined gradient threshold. If the gradient is not greater than a predetermined gradient threshold, the process continues to interrogatory block 696.

Interrogatory block 696 asks whether the top of the scope-of-view window 648 has been reached for a given vertical path of kernel 654 about the column being considered in scope-of-view window 648. If the top vertical position has been reached, the question is asked (block 698) whether the final termination position for scope-of-view window 648 in terms of analysis for horizontal lines has been reached. If such a termination position has not been reached, block 700 calls for the kernel to be incremented or repositioned to the next column at the bottom of scope-of-view window 648. There are, of course, variations to this search method that may be made without departing from the invention; for example, the kernel could be incremented to the next column at the same level and then passed downwardly. After incrementing kernel 654 at block 700, the analysis continues to block 688.

Returning to interrogatory block 696, if the answer to the interrogatory is negative, kernel 654 is repositioned vertically by one increment at block 702. The process then proceeds with block 688.

If the gradient is greater than the gradient threshold (interrogatory box 694), the Y value at that location ($Y_i$) is retained as indicated at block 704. Then the kernel window 654 is moved one tracking increment horizontally to the right in this example as indicated at block 706. The gradient for the kernel 654 is then calculated at the new position as indicated at block 708. The gradient is calculated at block 708 as previously described. At interrogatory block 710 the question is asked whether the newly calculated gradient is greater than the gradient threshold. If the gradient is greater than the gradient threshold, the process continues along path 712 to block 704 where the Y value for the new position is again retained. The loop defined by blocks 704, 706, 708, 710 and path 712 is continued as the kernel window tracks across the horizontal line segment, e.g., line segment 652.

Once the gradient for a new position as calculated at block 708 is no longer greater than a gradient threshold, the answer to the interrogatory at interrogatory box 710 will be in the negative and the process will continue to block 714. Block 714 specifies that a regression be performed on the Y values obtained in the above loop 704, 706, 708, 710 and 712, and block 716 specifies that the length $L_x$ be determined. The line length $L_x$ should be greater than a predetermined line length threshold as is the subject of interrogatory box 718.

If the line length, $L_x$, is greater than the length threshold the process continues to box 720. Box 720 specifies that the start and stop points and gradient for the line be saved, but other points may be saved as well. If the line length or magnitude is not greater than a line length threshold, the process continues at interrogatory box 722. Interrogatory box 722 asks whether a predetermined number of line segments have been saved as primitives. In aligning the template primitives and the image primitives, it is desirable to have a sufficient number of patterns to compare, and thus the question of box 722 is considered. If more than a predetermined number of line segments have been saved as primitives, the conversion of the digital image to image primitives may be considered complete at termination point 724. If fewer line segments have been saved as primitives than the predetermined number of line segments, the process continues at block 726. Block 726 indicates that the kernel window 654 is to return to the position where the tracking of the horizontal line segment 652 began and continue with the vertical scan of scope-of-view window 648 in search of horizontal line segments. Thus, the process continues by path 728 back to interrogatory box 696.

Referring to interrogatory box 698, the termination position for the scan or search for horizontal lines is reached, the answer to interrogatory box 698 will be affirmative and the process will continue to box 730. Box 730 indicates that a horizontal scan with kernel window 654 will be conducted looking for vertical line segments such as vertical line segment 650 in a manner analogous to the search that was done for horizontal lines as previously discussed. This scan for vertical lines is continued until all of the scope-of-view window 648 has been scanned for such lines or a predetermined number of line segments have been saved. If the scope-of-view window 648 is entirely scanned without reaching the predetermined number of line segments an arrow flag would normally be set. The process ends with termination point 732.

Figure 31:
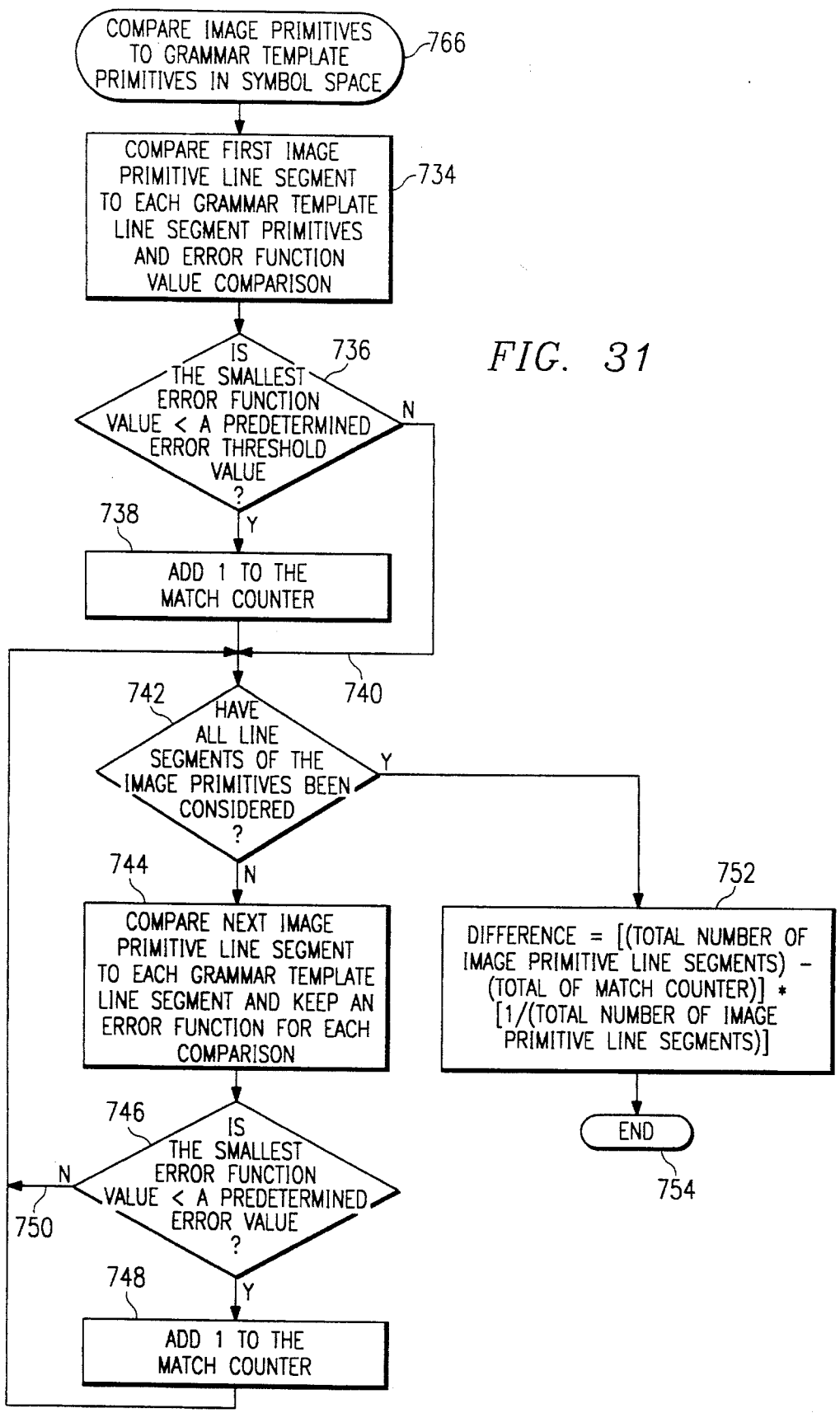
FIG. 31 is a block diagram showing one method for comparing image primitives to grammar primitives in symbolic space according to an aspect of present invention.

Referring now to FIG. 31, there is shown one method of the present invention for comparing image primitives to grammar template primitives in symbolic space. At the point where the process of FIG. 31 begins, a unique pattern (or patterns) for the particular device to be constructed on a wafer 620 has already been saved as grammar template primitives by which alignment can be based and the scope-of-view window 648 has been converted to image primitives (block 664). The image primitives consist of at least a predetermined number of line segments represented as at least two points, a length or magnitude, and the gradient. Beginning with block 734, the first image primitive line segment is compared to each of the grammar template line segment primitives while keeping an error function for each comparison. The error function value is a measure of how closely a given line segment matches another line segment. One approach for this error measurement is to consider the gradient and length of the lines. After the comparison of block 734, the question is asked at interrogatory box 736 whether the smallest error function value is less than a predetermined error threshold value. If the answer to the interrogatory at box 736 is affirmative, the number of matches is incremented by one at box 738. If the smallest error function value is greater than the predetermined error threshold, the process continues via path 740 to interrogatory box 742.

Interrogatory box 742 asks whether all the line segments of the image primitives have been considered. If not, block 744 specifies that the next image primitive line segment be compared to each line segment of the grammar template while keeping an error function value for each comparison as described previously. If in response to interrogatory box 746 it is determined that the smallest error function value is less than the predetermined error value, the match counter, which holds the number of matches, is incremented by one at block 748. Otherwise, the process continues along path 750 back to interrogatory box 742.

Eventually all the line segments of the image primitives will have been considered, and the answer to interrogatory box 742 will be affirmative. In that case, the process continues with box 752 where the difference between the image primitives and the grammar template primitives is quantified. The difference may be quantified by considering the total number of image primitive line segments less the number that matched all divided by the total number of image primitive line segments, i.e., the fraction of non-matches for the number considered. The comparison ends with determination point 754.

This technique of converting the video image to a digital image and then converting the digital image to primitives, which are form of representing the figure in symbolic space, generally allows for enhanced accuracy. This process is generally not unduly affected by digitization errors, $\Delta_p$. Consider for example, the line segment indicated by reference numeral 756 in FIG. 32a, which may be represented by the equation:

$$Y = ax + b \tag{84}$$

Figure 32A:
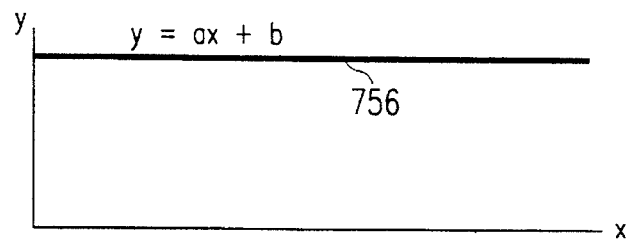
FIG. 32a is a schematic diagram of a line segment which is shown as a digitized line in FIG. 32b.
Figure 32B:
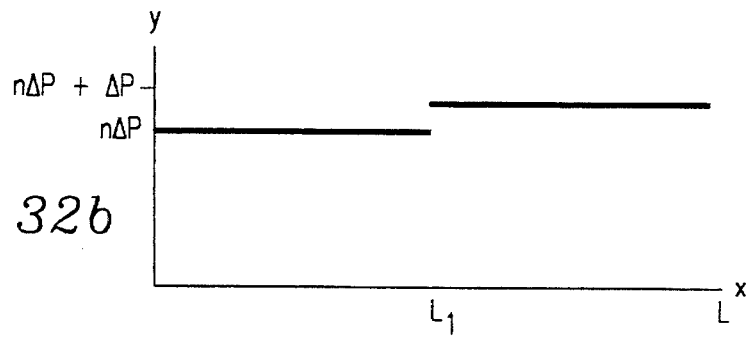
FIG. 32b is a schematic representation of the line segment shown in FIG. 32a after the line segment has been digitized with a digitization error $\Delta p$.

FIG. 32b shows two portions of line 756 of lengths L and $L_1$, one of which has been digitized with a digitization error, $\Delta_p$. If for example the Y value for the line position as digitized is considered, the error can be compensated for in the processing of the digitized information. For example, the Y value, C, could be determined as follows:

$$C = \frac{1}{L} \sum_{i=1}^{n} [ax_i + b] = \frac{1}{L} [N\Delta P \cdot L_1 + (n+1)\Delta P(L - L_1)] \tag{85}$$

which simplifies to:

$$= n\Delta P + [L - L_1]\frac{\Delta P}{L} \tag{86}$$

where $L > L_1$ and both L and $L_1$ are integers giving the length of the line in pixels. Equation 86 shows the way in which a coefficient representing the best possible accuracy with alignment is derived from the fractional expression $\Delta P/L$.

The previously described alignment process can be conducted at several locations on wafer 620. For example, FIG. 26a shows five sample sites 641 that may be used to align wafer 620. The process would be carried out for each site as previously described.

Figure 33:
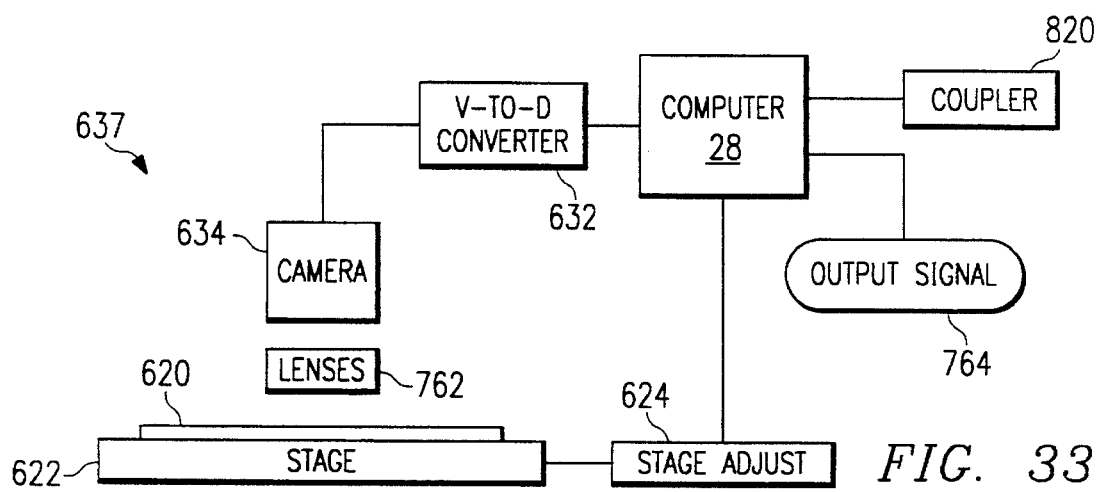
FIG. 33 is a schematic representation of a misregistration system according to an aspect of present invention.
Figure 34:
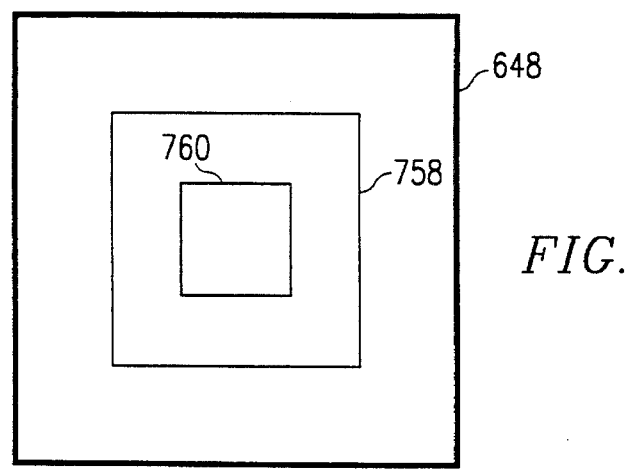
FIG. 34 is a schematic representation of a portion of a wafer showing two possible targets for use with an aspect of the present invention.

In addition to aligning a fabrication tool 637 such as stepper projection system 634, the amount of misalignment or misregistration must frequently be determined. An apparatus according to one aspect of the present invention for determining misregistration is shown in FIG. 33. Wafer 620 rests on stage 622 which is movable in conjunction with stage adjustor 624. Stage adjustor 624 receives adjustment or correction output signals from computer 628. Computer 628 produces signals that adjust the stage 622 so that camera 634 produces a scope-of-view window 648 that is centered about a first target image 758 and a second target image 760 as shown in FIG. 34. The camera 634 typically views targets 758 and 760 on wafer 620 through a lensing system 762, and produces a video image signal which is delivered to video-to-digital converter 632, which produces a digital image which is delivered to computer 628. Computer 628 produces an output signal 764 which is indicative of the misregistration measurement. The output signal 764 may be coupled by a coupler (820) associated with computer 628 to other fabrication tools 637 so that before fabrication of other wafers 638 of a given lot, the fabrication tool 637 may be adjusted to correct some or all of the misregistration.

The misregistration check determines the alignment discrepancies between two layers. First target image 758 is placed on one layer of the wafer 620 and second target 760 is placed on a second layer to which a comparison is desired with the first layer. According to the present invention, the targets are converted to image primitives and compared in symbolic space.

Figure 35:
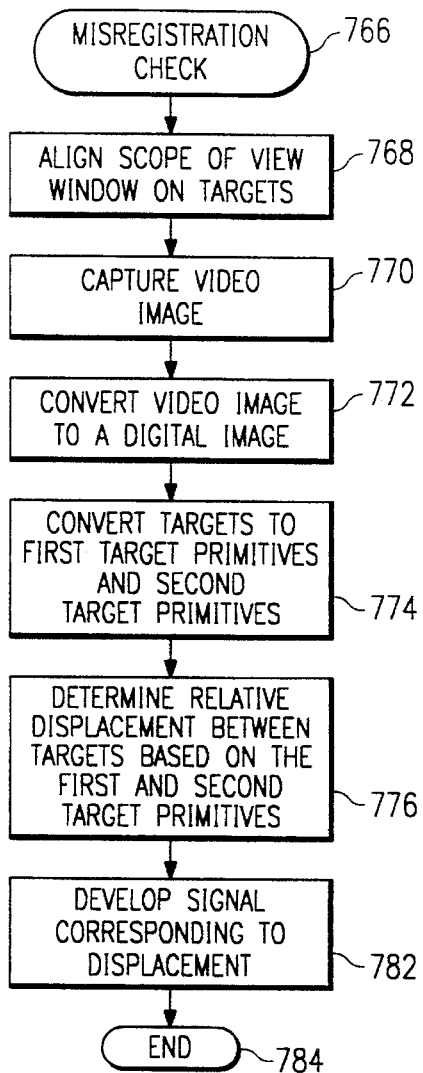
FIG. 35 is a block diagram showing one method of accomplishing a misregistration check according to an aspect of the present invention.
Figure 36:
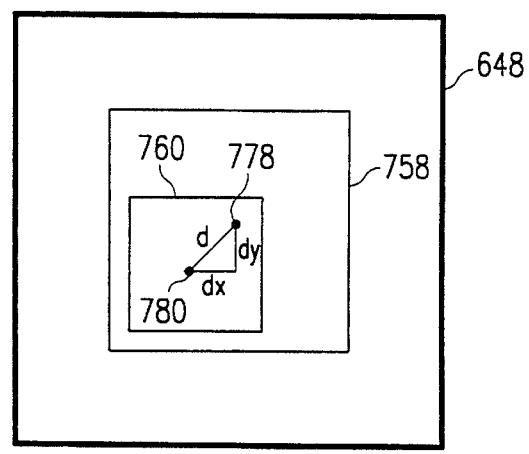
FIG. 36 is a schematic representation of a portion of a wafer showing two targets with a misregistration.

Referring to FIG. 35, one method for determining the misregistration is shown. The first step of the misregistration check (block 766) is to align the scope-of-view window 648 on targets 758 and 760 as indicated at block 768. This alignment is accomplished according to the alignment methods previously described. See FIG. 28. Once aligned or positioned, the contents of the scope-of-view window 648 is captured as a video image at block 770 by camera 634. The video image is then converted to a digital image at block 772 by a video-to-digital converter 632. The digital image is then converted to image primitives with first target primitives for the first target 758 and second target primitives for the second target 760 as indicated as block 774. The targets are converted to primitives in the fashion previously described. See FIG. 30.

The relative displacement between the first target 758 and the second target 760 is then determined by calculating the relative displacement of the first target primitives from the second target primitives in symbolic space (block 776). For example, if the first target image 758 is a box as shown in FIG. 34 and the second target image 760 is a box as shown in FIG. 34, the center of each box could be determined according to simple geometric techniques. Thus, referring to FIG. 36, the center of first target image 758 would be point 778 and the center of second target image 760 would be point 780. The relative displacement, e.g., dx and dy, can be determined based on the center points 778 and 780.

After computing the relative displacement between targets 758 and 760, an output signal may be developed corresponding to the displacement as indicated at block 782. The process of FIG. 35 terminates at block 784. The output signal produced at block 782 can be sent to other fabrication tools 637 through coupler 220 (FIG. 33) to compensate for the misregistration in subsequently processed wafers 620 of the same lot.

In another embodiment of an aspect of the present invention, a character recognition system can be coupled to the metrology or fabrication tool 637. Such a character recognition system would read a unique identifier on wafer 620 so that the predetermined location of the alignment target and the grammar template primitives may be automatically located by the computer 628 from a database containing such information for various wafers.

In operation, the character recognition, alignment, and misregistration system could operate to allow the following. First a wafer could be placed on a stage 622 and the operator could indicate to computer 628 that it is ready to process. At this point, human intervention would typically not be required as the remaining steps would be automated. The optical character recognition system would first determine the unique identifier located on the wafer 638. The character recognition system could be any system such as a convolution system. Having obtained the unique identifier for the wafer 620, the computer 628 can then look up the grammar template primitives for that particular wafer 620 and the predicted location of the alignment target. The computer 628 could then provide signals to stage adjuster 624 so that the stage moves wafer 620 to the initial position within a specified tolerance. The alignment technique previously described of converting an image to primitives and comparing it to the grammar template primitives to develop signals to use in conjunction with stage adjuster 624 can be used to align wafer 638. After aligning wafer 620, various processing steps can occur to the wafer such as producing a new layer. The registration of the new layer versus the previous layer or wafer 620 can then be determined with the misregistration check previously described.

Although the present invention and its advantages have been described in detail, it should be understood that various changes, substitutions and alterations can be made therein without departing from the spirit and scope of the invention as defined by the appended claims.

What is claimed is:

1. A method of image processing in symbolic space comprising the steps of:
   capturing a visual image as a digital image;
   decomposing the digital image to form image primitives;
   grouping the image primitives to form higher level image primitives comprising the steps of:
   (A) passing an operator window through a scope-of-view window for the image primitives with a predetermined search pattern;
   (B) for each segment found by the operator window, performing the following:
   (i) moving the operator window into contact with a first tangent point with respect to a first segment of the image primitives,
   (ii) rotating the operator window with respect to the first tangent point to locate a second segment if one exists,
   (iii) if a second segment is found, moving the operator window into contact with a second tangent point which is on the second segment, and
   (iv) repeating steps (B) and (iii) for each group of segments of image primitives;
   (C) recording primitives for the operator window for each group of consecutive segments found by the operator window to form higher level image primitives representing the outer trace of each group of segments found by the operator window; and
   processing the higher level image primitives in symbolic space.

2. A method for isolating portions of images in a digitized image having a plurality of segments, the method comprising the steps of:
   decomposing the digitized image to form image primitives; and
   linking segments of image primitives by considering the location and texture of the segments.

3. The method of claim 2 wherein the steps of decomposing the digitized image to form image primitives and linking segments of image primitives by considering the location and texture of segments comprises the steps of:
   decomposing the digitized image into image primitives for each segment including at least the start point, end point, left texture and right texture for each segment of the image;
   forming a first group of segments having approximately the same left texture and right texture;
   linking the segments of the first group of segments having end points and start points that substantially coincide to form at least a first linked segment;
   forming a second group of segments having approximately the same left texture or right texture as the interior texture of the first linked segment; and
   adding the segments of the second group that have approximately the same end points or start points as the end points or start points of the first linked segment to form an isolated image.

4. A method of processing a digitized image in symbolic space comprising the steps of:
   decomposing the digitized image to form image primitives based on line and arc segments of the image; and
   filtering noise from the image primitives by removing the segments reflecting a standard deviation greater than a predetermined threshold.

5. The method of claim 4 wherein the steps of decomposing and filtering comprise the steps of:
   decomposing the digitized image into image primitives of a plurality of segments forming the digitized image, the image primitives including at least the start point, end point and deviation for each segment;
   determining the length of each segment;
   determining the average length of the plurality of segments; and
   filtering noise from the image primitives by eliminating segments having a length less than the average length by a first predetermined threshold value and having a deviation greater than a second predetermined threshold.

6. A method for enhancing a partially occluded first visual image comprising the steps of:
   capturing a second visual image as a second digital image;
   decomposing the second digital image into image primitives;
   adding the image primitives of the decomposed second digital image to a knowledge base as grammar primitives;
   capturing a first digital image of the first visual image that is partially occluded;
   decomposing the first digital image to form image primitives of the first digital image;
   comparing the image primitives of the first digital image with the grammar primitives in the knowledge base of the second digital image;
   comparing the image primitives of the first digital image with the grammar primitives to determine differences;
   removing from the first digital image the differences between the first digital image and the second digital image that have a texture consistent with an unwanted occlusion; and
   filling in the removed portions of the first digital image with corresponding portions of the second digital image based on the grammar primitives therefor.

7. An apparatus for processing an image comprising:
   a camera for capturing a visual image in a scope-of-view window;
   a video-to-digital converter coupled to the camera for converting the visual image to a digital image;
   a computer coupled to the video-to-digital converter for receiving the digital image therefrom;

the computer having memory and software for processing the image, wherein the processing comprises:
- (A) passing a decomposition window through the scope-of-view window with a predetermined search pattern until a portion of the image is detected,
- (B) tracing the portion of the image that has been detected until a change in gradient greater than a first predetermined threshold is reached to define a first segment,
- (C) recording image primitives for the first segment,
- (D) continuing the trace if a segment gradient is being sensed by the decomposition window at the end point of the first segment until a change in gradient greater than the first predetermined threshold is reached to define a next segment,
- (E) recording image primitives for the next segment,
- (F) repeating (D) and (E) until no segment gradient is sensed in the decomposition window;
- (G) masking the recorded segments from the search pattern, and
- (H) continuing to pass the decomposition window through the scope-of-view window until locating another portion of the image and then repeating (B) through (G) or until the end of the search pattern is reached; and
- (I) processing the image by processing image primitives.

8. A method for processing an image comprising the steps of:
- (A) capturing a visual image in a scope-of-view window;
- (B) converting the visual image to a digital image;
- (C) decomposing the digital image into image primitives by:
  - (i) passing a decomposition window through the scope-of-view window with a predetermined search pattern until a portion of the image is detected,
  - (ii) tracing the portion of the image that has been detected until a change in gradient greater than a first predetermined threshold is reached to define a first segment,
  - (iii) recording image primitives for the first segment,
  - (iv) continuing the trace if a segment gradient is being sensed by the decomposition window at the end point of the first segment until a change in gradient greater than the first predetermined threshold is reached to define a next segment,
  - (v) recording image primitives for the next segment,
  - (vi) repeating steps (C)(iv) and (v) until no segment gradient is sensed in the decomposition window;
  - (vii) masking the recorded segments from the search pattern, and
  - (viii) continuing to pass the decomposition window through the scope-of-view window until locating another portion of the image and then repeating steps (C)(ii) through (vii) until the end of the search pattern is reached; and
- (D) processing the image by processing the image primitives.

9. The method of claim 8 wherein the step of processing the image primitives comprises the step of grouping the image primitives to form higher level image primitives.

10. The method of claim 8 wherein the step of processing the image primitives comprises the steps of linking segments of image primitives by considering the location and texture of the segments.

11. The method of claim 8 wherein the step of processing the image primitives comprises the step linking segments of image primitives by considering the location and texture of segments by:
- recording as image primitives at least the start point, end point, left texture and right texture for each segment of the image;
- forming a first group of segments having approximately the same left texture and right texture;
- linking the segments of the first group of segments having end points and start points that substantially coincide to form at least a first linked segment;
- forming a second group of segments having approximately the same left texture or right texture as the interior texture of the first linked segment; and
- adding the segments of the second group that have approximately the same end points or start points as the end points or start points of the first linked segment to form an isolated image.

12. The method of claim 8 wherein the step of processing the image primitives comprises the step of filtering noise from the image primitives by removing from the image primitives line or arc segments having a standard of deviation greater than a first threshold.

13. The method of claim 8 wherein the step of processing the image primitives comprises the step of filtering noise from the digitized image by:
- determining the length of each segment of the image primitives;
- determining the average length of the plurality of segments; and
- filtering noise from the image primitives by eliminating segments having a length less than the average length by a first predetermined threshold value and having a deviation greater than a second predetermined threshold.

14. The method of claim 8 wherein the step of processing the image primitives comprises the steps of identifying a portion of the digital image by:
- decomposing the digitized image into image primitives;
- forming a knowledge base containing grammar primitives corresponding to known images;
- comparing the image primitives to the grammar primitives to find the known image represented by grammar primitives in a knowledge base that best match the image primitives; and
- identifying the portion of the digitized image as the known image having the best matching grammar primitives.

15. The method of claim 8 wherein the step of processing the image primitives comprises the step of comparing the image primitives with grammar primitives in a knowledge base that represent a known object to determine the differences between the known object and the visual image.

* * * * *